US012293264B2

United States Patent
Okamoto

(10) Patent No.: US 12,293,264 B2
(45) Date of Patent: May 6, 2025

(54) INFORMATION PROCESSING SYSTEM, INFORMATION PROCESSING METHOD AND NON-TRANSITORY RECORDING MEDIUM

(71) Applicant: KONICA MINOLTA, INC., Tokyo (JP)

(72) Inventor: Yuji Okamoto, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 916 days.

(21) Appl. No.: 17/391,105

(22) Filed: Aug. 2, 2021

(65) Prior Publication Data

US 2022/0051137 A1    Feb. 17, 2022

(30) Foreign Application Priority Data

Aug. 11, 2020 (JP) ................................. 2020-135709

(51) Int. Cl.
G06N 20/00   (2019.01)
G06N 5/04    (2023.01)

(52) U.S. Cl.
CPC ............... *G06N 20/00* (2019.01); *G06N 5/04* (2013.01)

(58) Field of Classification Search
CPC ............................... G06N 20/00; G06N 5/04
USPC ......................................................... 706/12
See application file for complete search history.

(56) References Cited

U.S. PATENT DOCUMENTS

| 10,037,591 B2 | 7/2018 | Ichikawa et al. |
| 2012/0177249 A1* | 7/2012 | Levy .................. G06V 20/46 382/103 |
| 2020/0167258 A1* | 5/2020 | Chattopadhyay ..... G06F 9/5088 |

FOREIGN PATENT DOCUMENTS

| JP | 2013045219 A | 3/2013 |
| JP | 2016143086 A | 8/2016 |
| JP | 2018132830 A | 8/2018 |
| JP | 2019168856 A | 10/2019 |
| WO | 2019079008 A1 | 4/2019 |
| WO | WO-2020122024 A1 * | 6/2020 |

OTHER PUBLICATIONS

Office Action (Notice of Reasons for Refusal) issued on Apr. 30, 2024, by the Japanese Patent Office in corresponding Japanese Patent Application No. 2020-135709, and an English Translation of the Office Action. (8 pages).

* cited by examiner

*Primary Examiner* — Austin Hicks
(74) *Attorney, Agent, or Firm* — Buchanan Ingersoll & Rooney PC

(57) ABSTRACT

An information processing system that carries out a specified processing based on a learning model, comprises: a processor; a programmable logic device that rewrites logic data and reconstitutes a circuit; a machine learning processing unit that carries out machine learning and generates a new learning model for the specified processing; a convertor that converts the new learning model into the logic data that is operable in the programmable logic device; and a controller that enables the processor to carry out the specified processing based on the new learning model while the time the new learning model is converted into the logic data by the convertor.

20 Claims, 17 Drawing Sheets

INFORMATION PROCESSING SYSTEM, INFORMATION PROCESSING METHOD AND NON-TRANSITORY RECORDING MEDIUM

Japanese patent application No. 2020-135709 filed on Aug. 11, 2020 including description, claims, drawings, and abstract the entire disclosure is incorporated herein by reference in its entirety.

BACKGROUND

Technological Field

The present invention relates to an information processing system, an information processing method, and a non-transitory recording medium. One or more embodiments of the present invention more specifically relate to a technique for processing a predetermined processing based on a learning model.

Description of the Related Art

An OCR (Optical Character Recognition) is one of conventional techniques that recognizes a character included in an input image. It is difficult to enable a recognition of an image such as a logo using OCR. To recognize the logo, a template matching, for instance, is used. Even with the template matching, if the logo included in the input image is inclined, there will be a big difference between the input image and a template so that the logo cannot be recognized accurately.

A machine learning such as a deep learning (Deep Learning) has recently been used for inference of a logo image included in a receipt. This known technique is introduced, for example, in Japanese Patent Application Laid-Open No. JP 2019-168856 A (hereafter, conventional patent document 1). By using the deep learning for the logo determination, the logo can be determined even still the logo is inclined. This raises a recognition rate compared to the template matching.

In a field of the image processing, for instance, an algorism that uses a convolutional neural network (CNN) is broadly used for the machine learning by the deep learning. The convolutional neural network requires a huge amount of calculation for the convolutional operation. It has been considered that the convolutional neural network takes long time for the operation. As a performance of a programmable logic device such as a FPGA (Field Programmable Gate Array) has been improved recently, the operation time is shortened and its use is expanding.

The programmable logic device is enabled to realize a logical circuit as a specified circuit corresponding to the convolutional neural network. The programmable logic device, therefore, can carry out an inference processing efficiently compared to general purpose processors. By using the programmable logic device, the logic data is rewritten and an internal logical circuit is reconstituted. This known technique is introduced, for example, in Japanese Patent Application Laid-Open No. JP 2018-132830 A (hereafter, conventional patent document 2). By applying this technique, the logic data of the programmable logic device is rewritten when a new learning model is generated by the machine learning, for example. Thus, the inference processing corresponding to the new learning model can be carried out.

The known technique described in the conventional patent document 2, however, does not enable the programmable logic device to carry out the inference processing corresponding to the new learning model during the period after the new learning model is generated to completion of a rewriting process of the logic data of the programmable logic device. Especially, it takes long time such as few hours to few days for the processing to rewrite the new learning model into the logic data which is operable in the programmable logic device. The inference processing based on the new learning model cannot be carried out for long time.

SUMMARY

One or more embodiments provide an information processing system, an information processing method and a non-transitory recording medium that are enabled to carry out a processing based on a new learning model at the early stage when the new learning model is generated.

In one aspect, the present invention is directed to an information processing system that carries out a specified processing based on a learning model.

According to an aspect of the present invention, the information processing system comprises: a processor; a programmable logic device that rewrites logic data and reconstitutes a circuit; a machine learning processing unit that carries out machine learning and generates a new learning model for the specified processing; a convertor that converts the new learning model into the logic data that is operable in the programmable logic device; and a controller that enables the processor to carry out the specified processing based on the new learning model while the time the new learning model is converted into the logic data by the convertor.

In another aspect, the present invention is directed to an information processing method to carry out a specified processing based on a learning model, and the method is applied at a terminal device.

According to an aspect of the present invention, the information processing method is applied at a terminal device comprising: a processor; and a programmable logic device that rewrites logic data and reconstitutes a circuit. The method comprises: carrying out machine learning and generating a new learning model for the specified processing; converting the new learning model into the logic data that is operable in the programmable logic device; and enabling the processor to carry out the specified processing based on the new learning model while the time the new learning model is converted into the logic data.

In another aspect, the present invention is directed to a non-transitory recording medium storing a computer readable program to be executed by a hardware processor in a terminal device comprising: a processor; and a programmable logic device that rewrites logic data and reconstitutes a circuit.

According to an aspect of the present invention, the non-transitory recording medium stores the computer readable program, execution of the computer readable program by the hardware processor causing the hardware processor in the terminal device to perform: carry out machine learning and generate a new learning model for the specified processing; convert the new learning model into the logic data that is operable in the programmable logic device; and enable the processor to carry out the specified processing based on the new learning model while the time the new learning model is converted into the logic data.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.
(Basic Structure)

Figure 1:
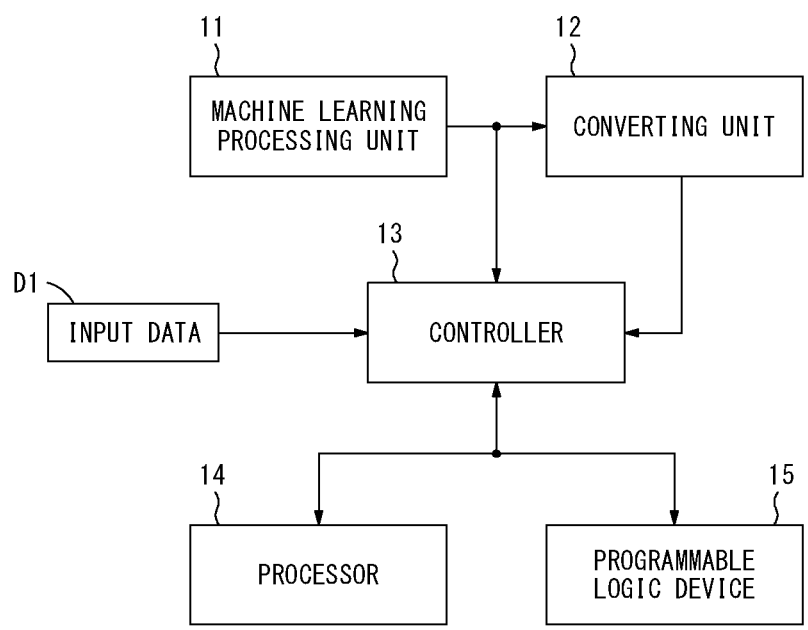
FIG. 1 illustrates an exemplary basic structure of an information processing system.

FIG. 1 illustrates an exemplary basic structure of an information processing system 1 of the present invention. The information processing system 1 carries out a specified processing based on a learning model. The information processing system 1 includes a machine learning processing unit 11, a converting unit 12, a controller 13, a processor 14 and a programmable logic device 15.

The processor 14 is formed from a general-purpose CPU (Central Processing Unit). The processor 14 executes a software for processor (program), and carries out processing of procedures determined in the software.

The programmable logic device 15 is a device capable of reconstituting a logic circuit by rewriting logic data. The programmable logic device 15 is formed from a FPGA (Field Programmable Gate Army), for example. The FPGA can change a circuit constitution anytime any number of times. The FPGA has a large circuit scale so it is suitable for a specialized device for carrying out a specified processing based on a learning model.

The machine learning processing unit 11 carries out a machine learning by deep learning so that a learning model for a specified processing is generated. The learning model regulates a neural network such as a convolutional neural network, for example. The specified processing of the present invention is an inference processing based on the machine model. The subject and the details of the inference is not limited. The machine learning processing unit 11 has multiple classification candidates in an output layer of the neural network. When input data is input, the machine learning processing unit 11 generates the learning model for inference of a correlation between the input data and each classification candidate.

The converting unit 12 converts the learning model generated by the machine learning processing unit 11 into logic data that is operable in the programmable logic device 15. The conversion by the converting unit 12 generally takes time. It sometimes takes few hours to few days from inputting the learning model to convert to completion of the logic data.

The controller 13 controls operations of the processor 14 and the programmable logic device 15. The controller 13 enables either the processor 14 or the programmable logic device 15 to carry out the specified processing based on the learning model generated by the machine learning processing unit 11.

The logic data generated based on the learning model by the machine learning processing unit 11 is written, and the inference circuit corresponding to the logic data is constituted in the programmable logic device 15. More specifically, a specialized circuit for carrying out the specified processing based on the learning model is constituted in the programmable logic device 15, and the programmable logic device 15 can carry out the specified processing efficiently.

The processor 14, on the other hand, is the general-purpose CPU. The processor 14 executes the software for processor so that it can carry out the specified processing. In execution of the software, the processor 14 incorporates the learning model generated by the machine learning processing unit 11 in the software as well as a library, for instance, and executes the software so that the specified processing based on the learning model can be carried out. The internal circuit in the processor 14 has a constitution for carrying out general arithmetic processing. The processor 14 has a lower efficiency to carry out the specified processing compared to the programmable logic device 15. The processor 14 requires three to five times as long to carry out the processing compared to the programmable logic device 15.

The controller 13 usually enables the programmable logic device 15 to carry out the specified processing based on the learning model. To be more specific, after obtaining input data D1 to which the specified processing is going to be carried out, the controller 13 outputs the input data D1 to the programmable logic device 15 and enables the programmable logic device 15 to carry out the specified processing based on the learning model for the input data D1. As a result, the controller 13 can obtain a result of the inference more efficiently compared to a case where the inference is carried out by the processor 14.

Figure 2:
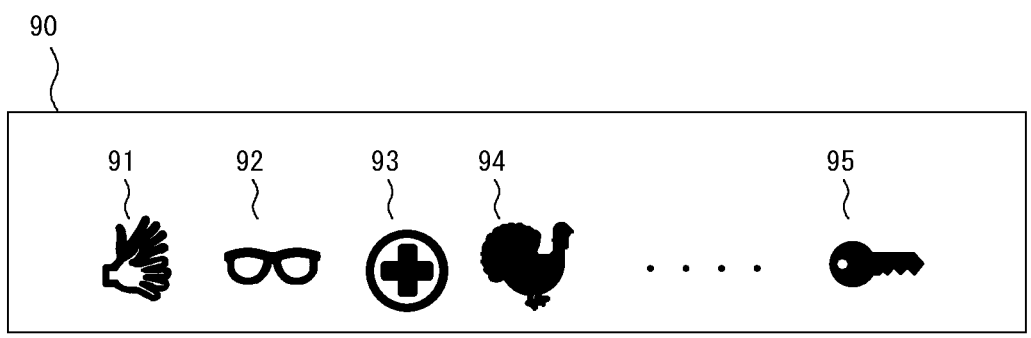
FIG. 2 illustrates an exemplary classification candidate in which multiple pattern images are registered.

As the specified processing, the inference processing that infers a matching degree between each of the multiple pattern images set as the classification candidate and the input image while the input image is included in the input data D1 is explained as an example. As illustrated in FIG. 2, for example, it is assumed that multiple pattern images 91 to 95 are registered as classification candidates 90. The pattern image 91 is a logo image that has a hand pattern. The pattern image 92 is a logo image that has a glasses pattern. The pattern image 93 is a logo image that has a pattern of a cross inside a circle. The pattern image 94 is a logo image that has a chicken pattern. The pattern image 95 is a logo image that has a key pattern. In this case, in the programmable logic device 15, a circuit that infers the matching degree between the input image included in the input data D1 and each pattern image 91 to 95 is constituted. Once the input data D1 is input from the controller 13, the programmable logic device 15 outputs numeric data indicating the matching degree between the input image included in the input data D1 and each pattern image 91 to 95 as a result of the inference.

Figure 3:
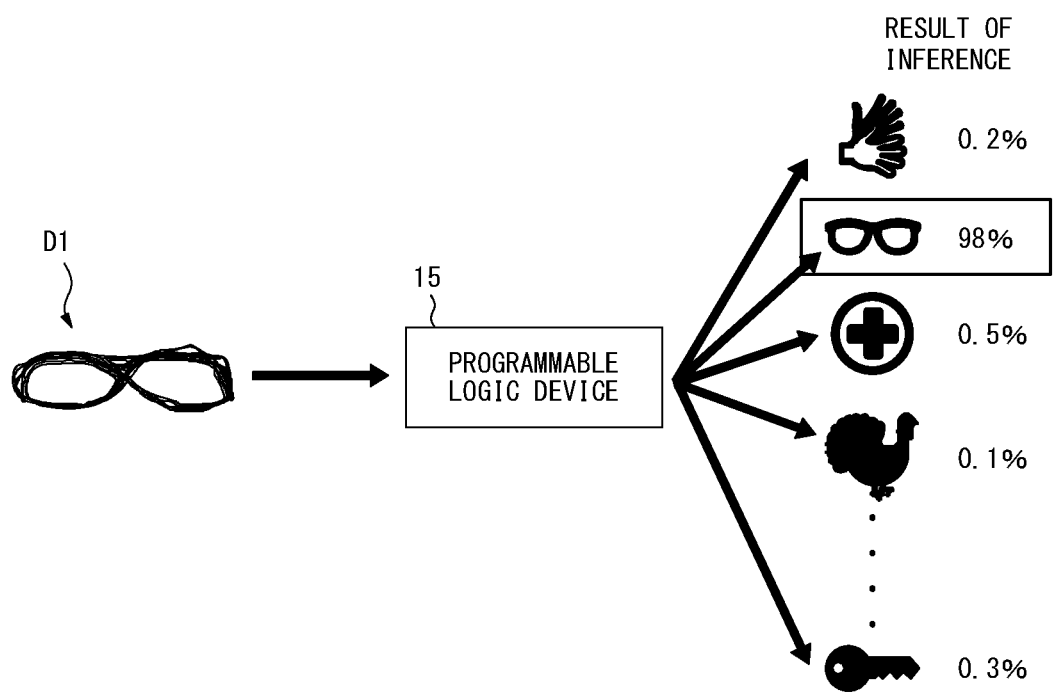
FIG. 3 illustrates an exemplary inference carried out by a programmable logic device.

FIG. 3 illustrates an exemplary inference processing carried out by the programmable logic device 15. In the example of FIG. 3, an image resembles a form of glasses is included as the input image D1. In this case, after inputting the input data D1 to the programmable logic device 15, the programmable logic device 15 carries out the inference in the logic circuit corresponding to the learning model. The result of the inference as illustrated in FIG. 1 is obtained. To be more specific, the programmable logic device 15 infers the matching degree between the input image and the pattern image 92 as 98%. The programmable logic device 15, infers the matching degree between the input image and each of the other pattern images 91, 93, 94 and 95 as less than 1%. This inference result seems correct by looking at it objectively.

This type of the inference may be used for a logo determination of the input image, for instance. The logo determination enables identification of a brand, a shop and/or a company, for example. The inference may be applied to various kinds of applications including a purchase analysis of clients, accounting operations including invoices and receipts and a business card management.

Figure 4:
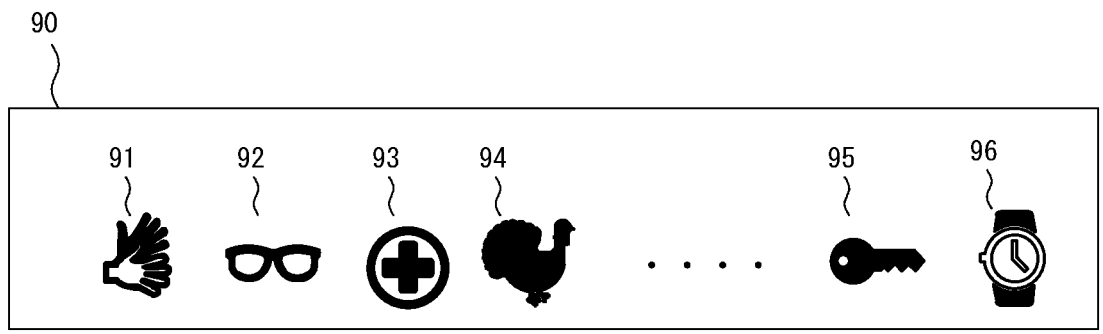
FIG. 4 illustrates an example when a new pattern image is additionally registered with the classification candidate of FIG. 2.

The logo image of a shop or a company can be changed suddenly. In such a case, a pattern image corresponding to the new logo image is registered in the machine learning processing unit 11 as a new classification candidate. FIG. 4 illustrates an example when a new pattern image 96 is additionally registered with the classification candidate 90 of FIG. 2. The new pattern image 96 is a logo image that has a watch pattern. The new classification candidate is additionally registered so the number of classifications may exceed a maximum number of classifications. In this case, in order to increase the maximum number of classifications, a structure of the neural network needs to be changed. Even still the number of classifications has not been exceeded the maximum number of classifications, the change in the neural network structure may be required for enhancing accuracy of the inference. The machine learning processing unit 11 carries out the machine learning by deep learning to enable the new pattern image 96 to be recognizable. The machine learning processing unit 11 thus generates the new learning model which is different from the previous learning model. The machine learning processing unit 11 outputs each of the new learning model to the converting unit 12 and the controller 13.

After the new learning model is generated by the machine learning processing unit 11, the converting unit 12 converts the new learning model into the logic data operable in the programmable logic device. As described above, the converting process carried out by the converting unit 12 takes long time. A specified period is required until completion of the logic data.

While the processing of converting the new learning model into the logic data is carried out by the converting unit 12, the controller 13 may obtain the input data D1 to infer. In this case, the accuracy of the result of the inference may be degraded if the predetermined processing is carried out by the programmable logic device 15.

Figure 5:
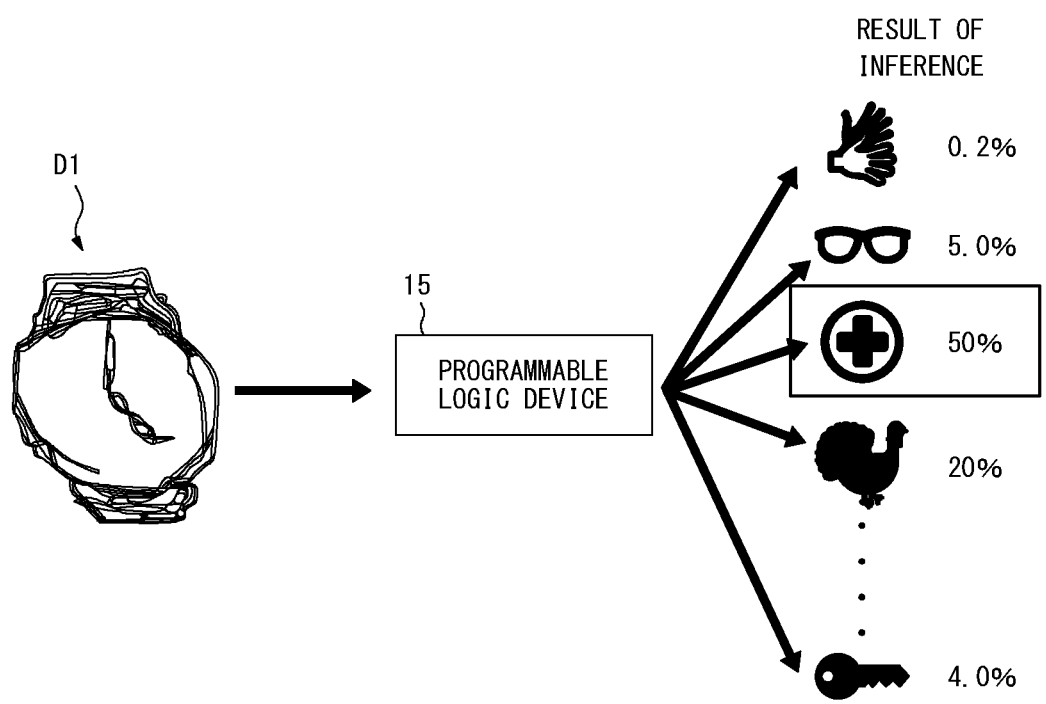
FIG. 5 illustrates an example of degradation of accuracy of the inference result carried out by the programmable logic device.

FIG. 5 illustrates an example of degradation of the accuracy of the result of the inference carried out by the programmable logic device 15. An image looks like a shape of a watch is included as an input image in the input data D1 of FIG. 5. When the input data D1 is input to the programmable logic device 15, the programmable logic device 15 carries out the inference in the logic circuit corresponding to the previous learning model which is generated before the new model is generated. As a result, the programmable logic device 15 obtains the result of the inference as illustrated in FIG. 5. To be more specific, the programmable logic device 15 infers the pattern image 63 as a logo image that has the highest matching degree with the input image. The matching degree in this case is 50% and it cannot be said that this number is reliable. The inference may be an erroneous determination.

It is assumed that the controller 13 obtains the input data D1 to infer while the new learning model is converted into the logic data by the converting unit 12. In this case, the controller 13 enables the processor 14 to carry out the specified processing based on the new learning model generated by the machine learning processing unit 11. More specifically, the processor 14 is controlled to alternatively carry out the specified processing based on the new learning model during the period in which the programmable logic device 15 cannot carry out the specified processing based on the new learning model. As a result, the specified processing based on the new learning model can be carried out at an early stage. Also, the highly reliable inference result based on the new learning model can be obtained. The detailed embodiments of the information processing system 1 that has the above-described basic structure are described.

First Embodiment

Figure 6:
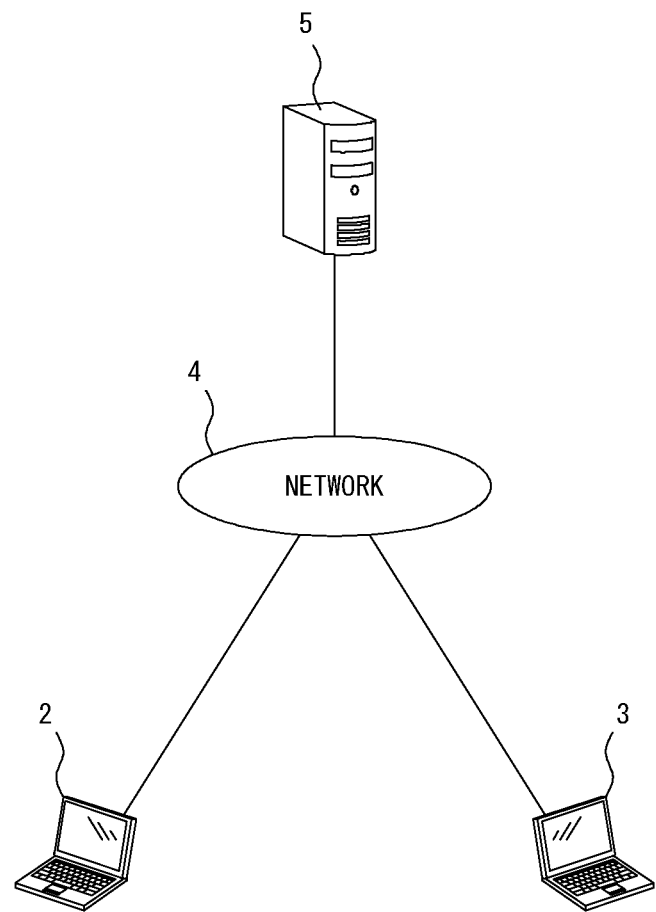
FIG. 6 illustrates an exemplary conceptual configuration of the information processing system according to a first embodiment.

FIG. 6 illustrates an exemplary conceptual configuration of the information processing system 1 according to the first embodiment. The information processing system 1 of the first embodiment, for example, is configured as a network system that includes multiple terminal devices 2 and 3, a network 4 and a server 5.

The terminal devices 2 and 3 are information processing devices constructed by personal computers (PC) or tablet terminals, for instance. The controller 13, the processor 14 and the programmable logic device 15 as illustrated in FIG. 1 are mounted on each of the multiple terminal devices 2 and 3. When the input data D1 is input by the user, the terminal devices 2 and 3 are enabled to carry out the specified processing based on the learning model subjected to the input data D1. The multiple terminal devices 2 and 3 are connected to the network 4 formed from LAN (Local Area Network), for example. The network 4 may include a wide area network such as the internet.

The server 5 is connected to the network 4, and is communicable with the terminal devices 2 and 3. The server 5 is installed on a cloud on the internet, for example. The machine learning processing unit 11 and the converting unit 12 as illustrated in FIG. 1 are mounted on the server 5. The server 5 is enabled to provide the terminal devices 2 and 3 with the learning model, the software for processor and the logic data.

Figure 7:
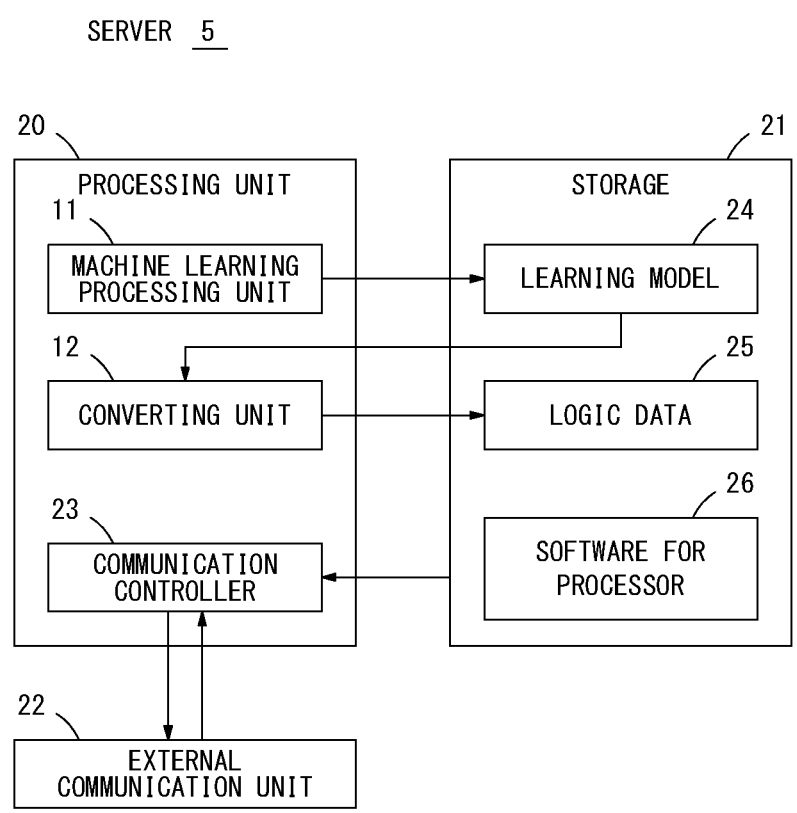
FIG. 7 illustrates a block diagram showing an exemplary hardware structure of a server.

FIG. 7 illustrates a block diagram showing an exemplary hardware structure of the server 5. The image forming device 5 is provided with a processing unit 20, a storage 21 and an external communication unit 22. The processing unit 20 includes a CPU and a memory that are not shown in FIG. 7, for instance. The processing unit 20 carries out a variety of processing. The storage 21 is formed from a non-volatility device such as a hard disk drive (HDD) or a solid-state drive (SDD), for example. The external communication unit 22 is an interface for the server 5 to communicate with the terminal devices 2 and 3 over the network 4.

The CPU executes a predetermined program so that the processing unit 20 serves as the machine learning processing unit 11, the converting unit 12 and a communication controller 23.

The machine learning processing unit 11 carries out the machine learning by the deep learning as described above, and generates a learning model 24 for the specified processing. The specified processing according to the first embodiment is an image processing that infers whether the input image matches one of the predetermined multiple pattern images based on the learning model. When the pattern image corresponding to the new logo image is registered as a new classification candidate, the machine learning processing unit 11 carries out the machine learning to recognize the new pattern image and generates the new learning model 24 which is different from the previous learning model. The new learning model 24 generated by the machine learning processing unit 11 is stored in the storage 21.

The converting unit 12 is brought into operation when the new learning model 24 is generated by the machine learning processing unit 11. The converting unit 12 reads the new learning model 24 in the storage 21, and coverts the learning model into logic data 25 operable in the programmable logic device 15. The logic data 25 generated by the converting unit 12 is stored in the storage 21. It requires a specified period that the logic data is to be stored in the storage 21 after the conversion is started by the converting unit 12.

The communication controller 23 is brought into operation not only when the new learning model 24 is generated by the machine learning processing unit 11 but also when the conversion by the converting unit 12 is complete and the logic data 25 is stored in the storage 21. The communication controller 23 communicates with the terminal devices 2 and 3 via the external communication unit 22.

When the new learning model 24 is generated by the machine learning processing unit 11, the communication controller 23 notifies the terminal devices 2 and 3 that the new learning model 24 is generated. A request for the new learning model 24 may be received from the terminal device 2 or 3 as a response to the notification. In this case, the communication controller 23 reads the new learning model 24 in the storage 21 and sends the learning model 24 to the terminal device 2 or 3. The communication controller 23 reads a software for processor 26 in the storage 21 and sends the read software for processor 26 to the terminal device 2 or 3 together with the new learning model 24. The software for processor 26 is to enable the processor 14 of each of the terminal devices 2 and 3 to carry out the specified processing based on the new learning model 24.

It is assumed that the conversion by the converting unit 12 is complete and the logic data 25 corresponding to the new learning model 24 is stored in the storage 21. In this case, the communication controller 23 notifies the terminal devices 2 and 3 of the generation of the logic data 25. As a response to the notification, the request for the logic data 25 may be received from the terminal device 2 or 3. In this case, the communication controller 23 reads the logic data 25 in the storage 21 and sends the read logic data 25 to the terminal device 2 or 3.

Figure 8:
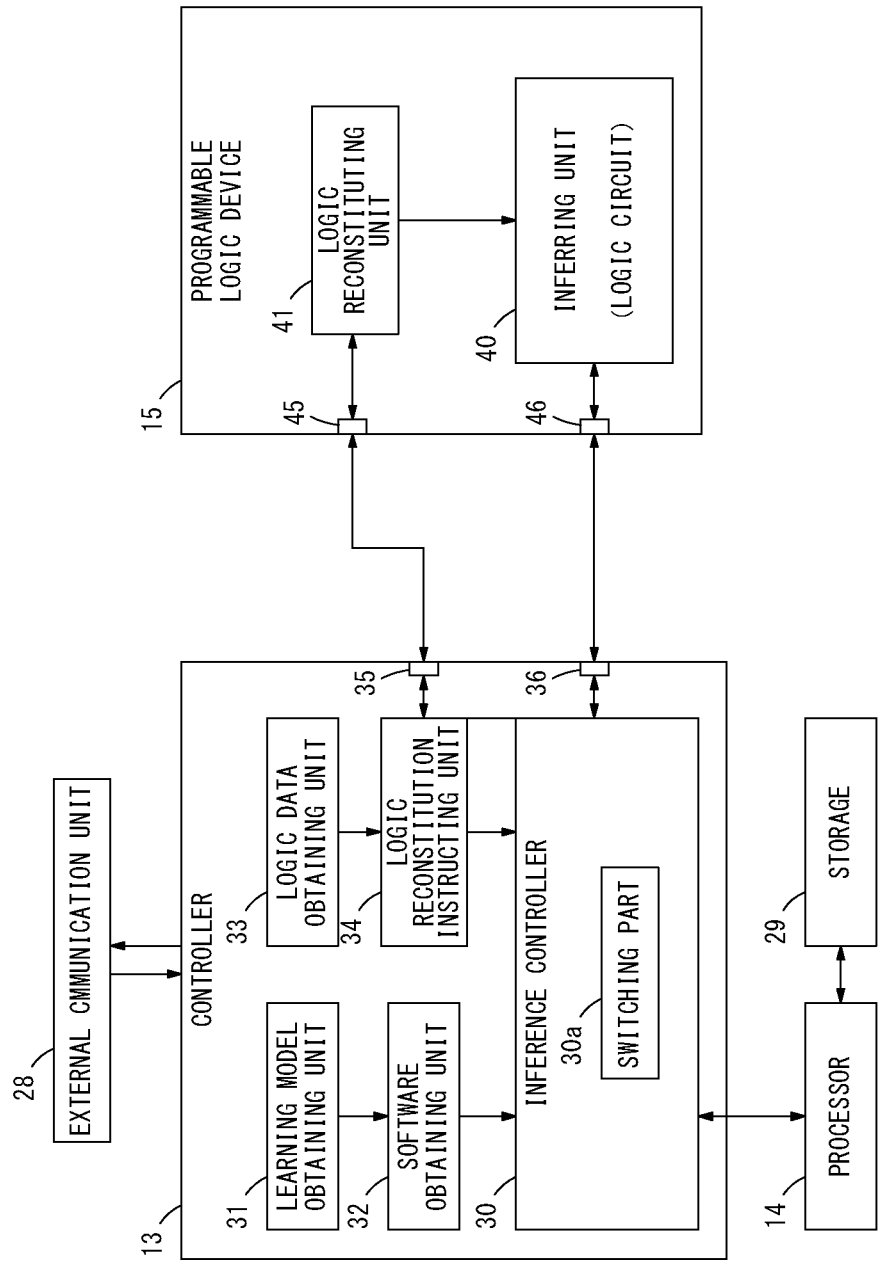
FIG. 8 illustrates a block diagram showing an exemplary hardware structure of a terminal device.

FIG. 8 illustrates a block diagram showing an exemplary hardware structure of the terminal device 2. The structure of the terminal device 3 is the same as the exemplary hardware structure of the terminal device 2. The terminal device 2 is provided with the processor 14, the programmable logic device 15, an external communication unit 28 and a storage 29. The external communication unit 28 is an interface for the terminal device 2 to communicate with the server 5 and/or another terminal device 3 over the network 4. The storage 29 is formed from a non-volatility device such as a hard disk drive (HDD) or a solid-state drive (SDD), for example. The new learning model 24, the software for processor 26 and the logic data 25 obtained from the server 5 are stored in the storage 29. Also, a program executed by a CPU of the controller 13 described later is stored in the storage 29.

The controller 13, as described above, controls to enable the processor 14 or the programmable logic device 15 to carry out the specified processing based on the learning model 24. The controller 13 includes the CPU and a memory that are not shown in FIG. 8, for instance. The CPU reads and executes the predetermined program in the storage 29 so that the controller 13 serves as an inference controller 30, a learning model obtaining unit 31, a software obtaining unit 32, a logic data obtaining unit 33 and a logic reconstitution instructing unit 34.

The controller 13 is connected to the programmable logic device 15 via two connecting parts, a first connecting part 35 and a second connecting part 36. The first connecting part 35 of the two connecting parts is to rewrite the logic data in the programmable logic device 15 and reconstitute the circuit. The first connecting part 35 is formed from a USB connecting interface, for instance. The second connecting part 36 is to enable the programmable logic device 15 to carry out the inference which is the specified processing. The second connecting part 36 is a connecting interface that allows a high speed/large capacity communication compared to the first connecting part 35. The second connecting part 36 is formed from a PCIe connecting interface, for instance.

The inference controller 30 receives an input of the input data D1. The inference controller 30 then enables either the programmable logic device 15 or the processor 14 to carry out the inference that infers the matching degree between each of the multiple pattern images registered in advance and the input image included in the input data D1. The input data D1 may be input through an external connecting terminal such as an USB connecting terminal, for example, which is not shown in FIG. 8, or the external communication unit 28.

When the notification of the generation of the new learning model 24 is not received from the server 5, the inference controller 30 enables the programmable logic device 15 to carry out the inference. More specifically, the inference controller 30 outputs the input image included in the input data D1 to the programmable logic device 15 via the second connecting part 36, and enables the programmable logic device 15 to carry out the inference. The inference controller 30 obtains a result of the inference carried out by the programmable logic device 15, and outputs the result of the inference to a designated destination. The destination in this case is a sender of the input data D1, for instance. However, this is not given for the limitation. The inference controller 30 may output the result of the inference to an application designated in advance by the user.

The learning model obtaining unit 31 is brought into operation upon receipt of the notification of the generation of the new learning model 24 from the server 5. The learning model obtaining unit 31 sends a request for the new learning model 24 to the server 5, and obtains the new learning model 24 from the server 5. After obtaining the new learning model 24 from the server 5, the learning model obtaining unit 31 stores the learning model 24 in the storage 29.

The software obtaining unit 32 becomes operative together with the learning model obtaining unit 31. The software obtaining unit 32 obtains the software for processor 26 that is sent together with the new learning model 24 by the server 5. The software obtaining unit 32 stores the software for processor 26 in the storage 29.

The inference controller 30 includes a switching part 30a. The switching part 30a becomes operative when the new learning model 24 is obtained by the learning model obtaining unit 31. The switching part 30a switches a device that carries out the inference to the processor 14 from the programmable logic device 15. After the switching part 30a switches, the inference controller 30 may receive the input data D1. When the inference controller 30 inputs the input data D1, it enables the processor 14 to carry out the inference. To be more specific, the inference controller 30 switches the device that carries out the inference to the processor 14 during the period the new learning model 24 is converted into the logic data 25 in the server 5 so that the inference based on the new learning model 24 is carried out by the processor 14.

After an instruction to carry out the inference is received from the inference controller 30, the processor 14 reads and executes the new learning model 24 and the software for processor 26 in the storage 29. The processor 14 then carries out the inference to infer the matching degree between the input image included in the input data D1 input from the inference controller 30 and each of the multiple pattern images 91 to 96 (refer FIG. 4) in the new learning model 24, and outputs the result of the inference that indicates the matching degree between the input image and each pattern image 91 to 96.

Figure 9:
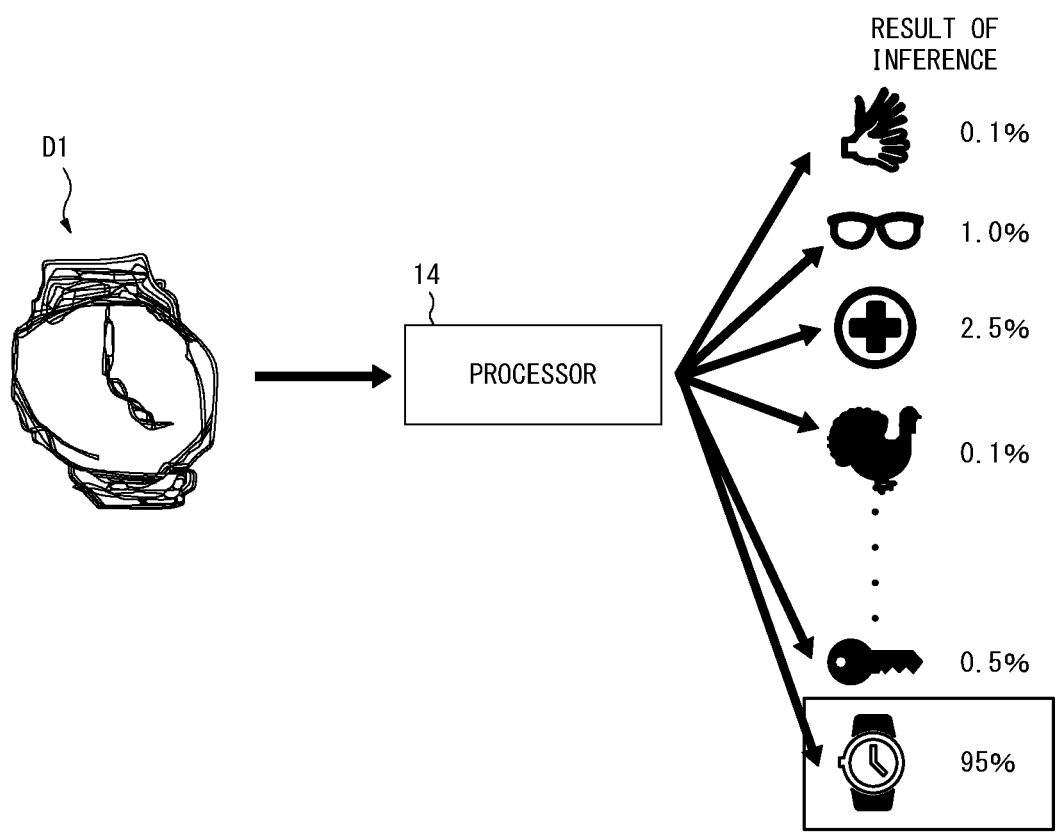
FIG. 9 illustrates an example of the result of the inference carried out by a processor.

FIG. 9 illustrates an example of the result of the inference carried out by the processor 14. An image looks like the shape of the watch is included in the input image in the input data D1 of FIG. 9. When the input data D1 is input to the processor 14, the processor 14 carries out the inference based on the new learning model 24. The processor 14 then obtains the result of the inference as illustrated in FIG. 9. The newly registered pattern 96 is inferred by the processor 14 as a logo image that has the highest matching degree to the input image. The matching degree between the input image and the pattern image 96 is 95%, and the obtained result is highly reliable.

The information processing system 1 of the first embodiment enables the general processor 14 to carry out the inference while the time the programmable logic device 15 which is capable of efficiently carrying out the inference is not enabled to carry out the inference based on the new learning model 24. As a result, the result of inference to which the new learning model 24 is applied may be obtained and degradation of the reliability can be prevented.

The logic data obtaining unit 33 becomes operative when the notification of the generation of the logic data 25 corresponding to the new learning model 24 is received from the server 5. The logic data obtaining unit 33 requests for the logic data 25 corresponding to the new learning model 24 to the server 5, and obtains the logic data 25 from the server 5. After receiving the logic data 25 from the server 5, the logic data obtaining unit 33 stores the logic data 25 in the storage 29.

The logic reconstitution instructing unit 34 becomes operative when the logic data 25 is obtained by the logic data obtaining unit 33. The logic reconstitution instructing unit 34 reads the logic data 25 in the storage 29, and rewrites the logic data in the programmable logic device 15 to the logic data 25 corresponding to the new learning model 24 through the first connecting part 35 so that it reconstitutes the circuit.

The programmable logic device 15 is provided with an inferring unit 40, a logic reconstituting unit 41, a first connecting part 45 and a second connecting part 46. The first connecting part 45 is connected to the first connecting part 35 of the controller 13. The first connecting part 45 is, for example, formed from a USB connecting interface, for instance. The second connecting part 46 is connected to the second connecting part 36 of the controller 13. The second connecting part 46, for example, is formed from a PCIe connecting interface, for instance.

The inferring unit 40 is configured by the logic circuit corresponding to the logic data. The inferring unit 40 carries out the inference based on the input data D1 provided by the controller 13. The logic circuit in the inferring unit 40 has a circuit structure corresponding to the learning model. The logic circuit can have a change in the circuit structure and can be reconstituted.

When the input data D1 is provided by the controller 13 through the second connecting part 46, the inferring unit 40 carries out the inference subjected to the input image included in the input data D1. To be more specific, the inferring unit 40 infers the matching degree between the input image and each of the multiple pattern images. The inferring unit 40 outputs the result of the inference obtained by the inference to the controller 13 through the second connecting part 46.

After obtaining the logic data 25 corresponding to the new learning model 24 from the controller 13 through the first connecting part 45, the logic reconstituting unit 41 carries out a processing to reconstitute the logic circuit of the inferring unit 40 based on the logic data 25. The logic circuit in the inferring unit 40 is then reconstituted to the logic circuit corresponding to the new learning model 24. The time required for the reconstitution is shorter than the time required for the converting unit 12 to convert the learning model 24 into the logic data 25. The reconstitution of the logic circuit in the inferring unit 40 is static. During the period in which the reconstitution is carried out, the inference cannot be carried out in the inferring unit 40. The inference controller 30, hence, enables the processor 14 to carry out the inference subjected to the input data D1 even when the input data D1 is obtained during the period the reconstitution of the circuit is carried out in the programmable logic device 15.

After the reconstitution of the circuit in the inferring unit 40 is complete, the logic reconstituting unit 41 outputs a notification of completion of the reconstitution to the logic reconstitution instructing unit 34 through the first connecting part 45. The programmable logic device 15 then is enabled to carry out the inference in the reconstituted circuit.

When the notification of completion of the reconstitution is obtained from the programmable logic device 15, the logic reconstitution instructing unit 34 notifies the inference controller 30 that the reconstitution of the circuit in the programmable logic device 15 is complete.

After obtaining the notification of completion of the reconstitution of the circuit, the inference controller 30 brings the switching part 30a into operation. When the input data D1 is obtained thereafter, the switching part 30a switches the device that carries out the inference to the programmable logic device 15 from the processor 14. To be more specific, when the programmable logic device 15 is got ready for the inference based on the new learning model 24, the inference controller 30 switches the device that carries out the inference to the programmable logic device 15 from the processor 14 so that it is back to the state that the inference can be carried out efficiently.

When receiving the input data D1 after the switching, the inference controller 30 enables the programmable logic device 15 to carry out the inference. More specifically, the inference controller 30 outputs the input data D1 to the programmable logic device 15 through the second connecting part 46, and enables the programmable logic device 15 to carry out the inference subjected to the input image included in the input data D1. When the instruction to carry out the inference is received from the inference controller 30, the programmable logic device 15 carries out the inference based on the new learning model 24 in the reconstituted logic circuit. The programmable logic device 15 then outputs the result of the inference to the controller 13.

Figure 10:
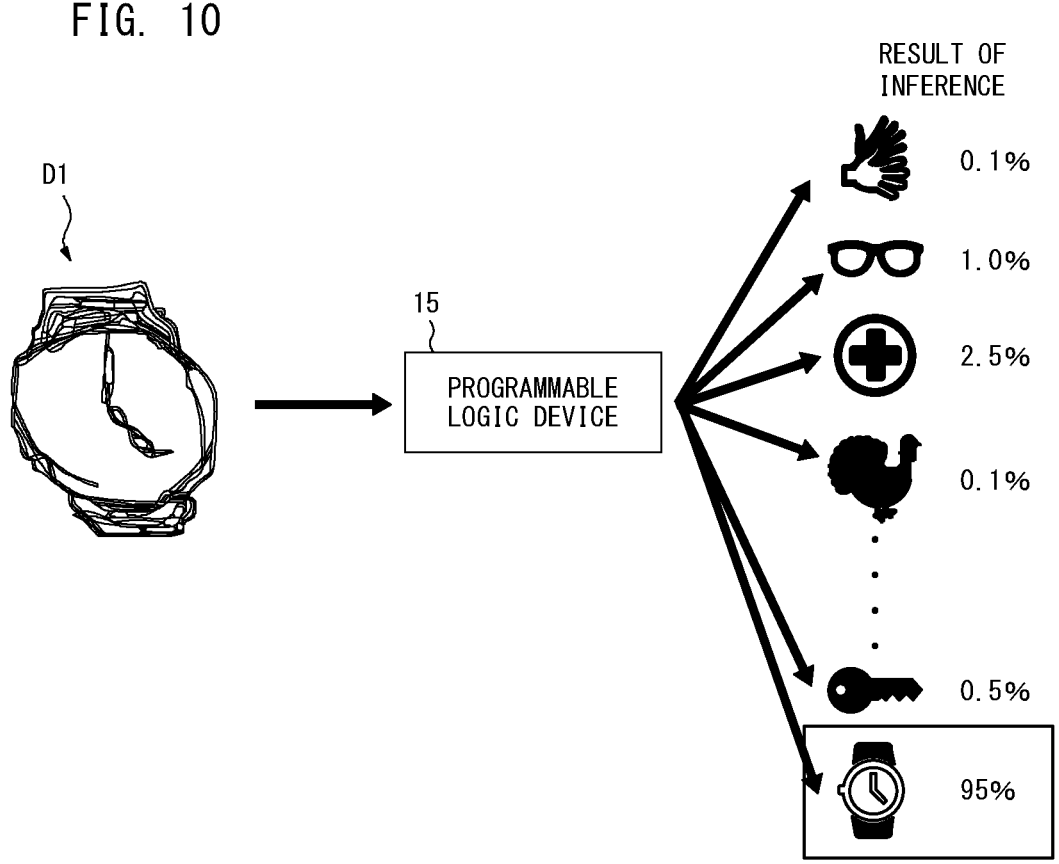
FIG. 10 illustrates an example of the result of the inference carried out by the programmable logic device.

FIG. 10 illustrates an example of the result of the inference carried out by the programmable logic device 15. An image looks like the shape of a watch is included in the input image in the input data D1 of FIG. 10. When the input data D1 is input to the programmable logic device 15, the programmable logic device 15 carries out the inference based on the new learning model 24. The programmable logic device 15 then obtains the result of the inference as illustrated in FIG. 10. The newly registered pattern 96 is inferred by the programmable logic device 15 as a logo image that has the highest matching degree to the input image. The matching degree between the input image and the pattern image 96 is 95%, and the obtained result is highly reliable.

Figure 11:
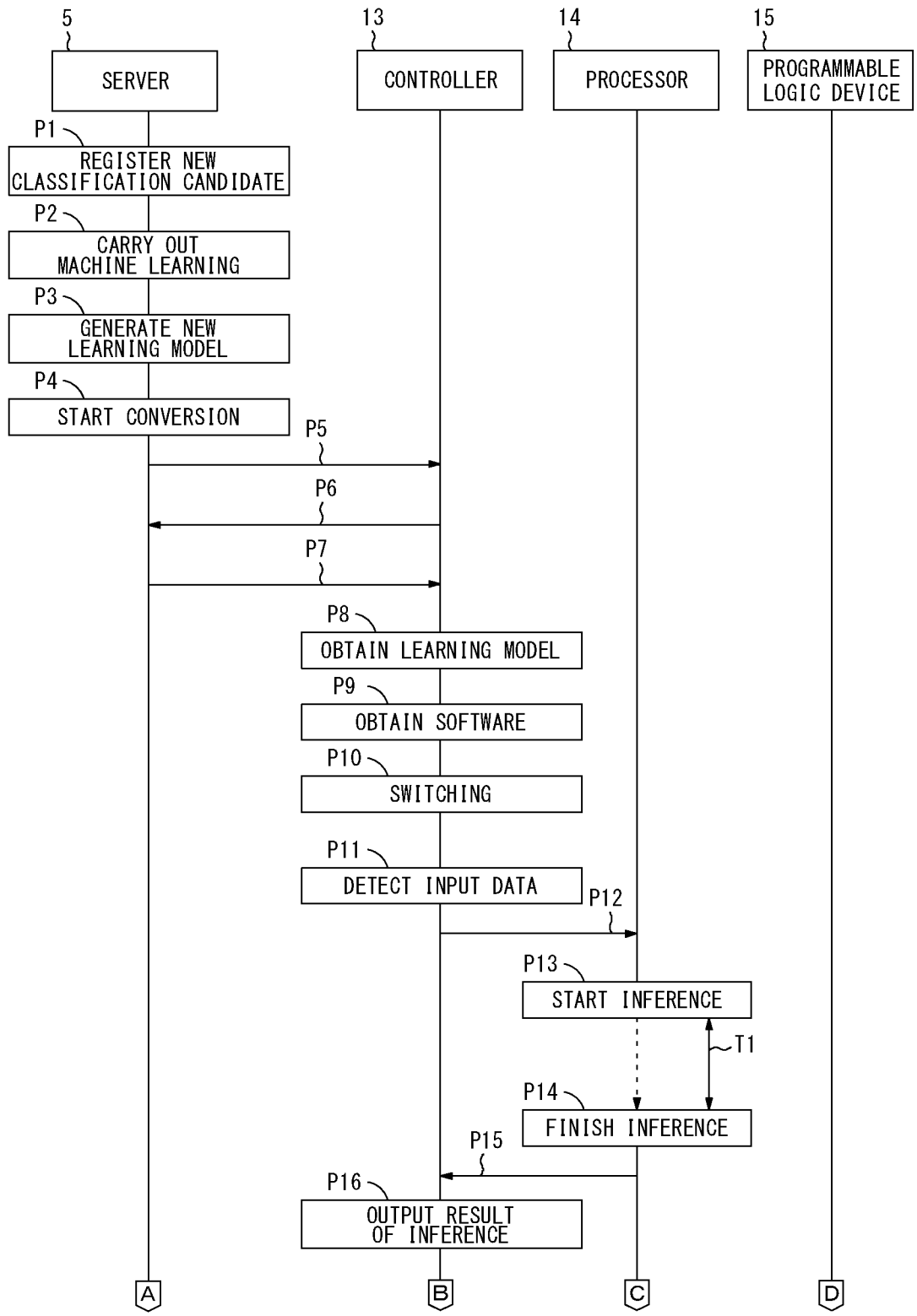
FIG. 11 is a flow diagram showing an exemplary overall operation performed at the information processing system according to the first embodiment.
Figure 12:
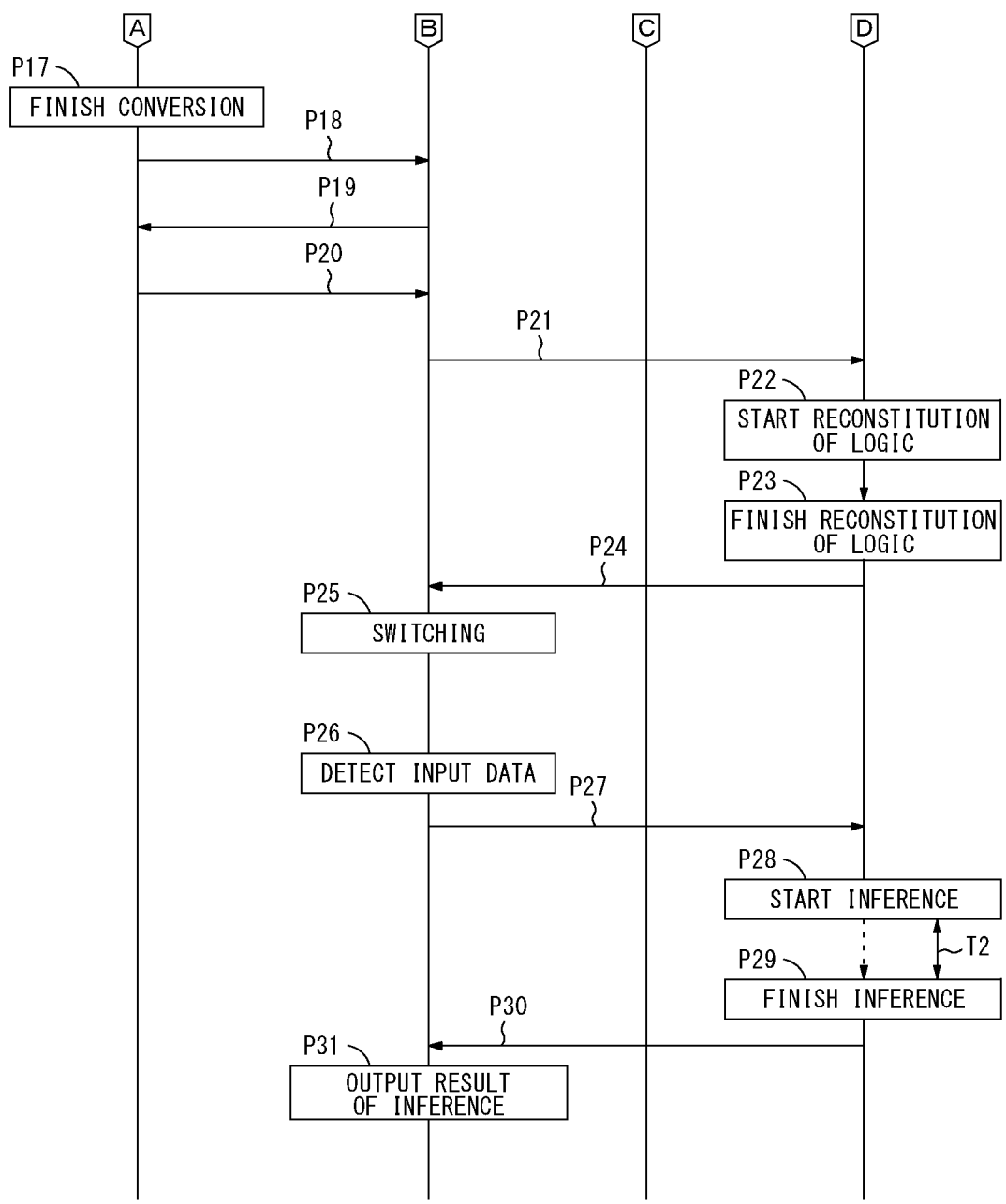
FIG. 12 is a flow diagram showing an exemplary overall operation performed at the information processing system according to the first embodiment.

FIGS. 11 and 12 are flow diagrams showing an exemplary overall operation performed at the information processing system 1 according to the first embodiment. As illustrated in FIG. 11, the new classification candidate is registered with the server 5 (process P1). The server 5 then carries out the machine learning (process P2), and generates the new learning model 24 (process P3).

After generating the new learning model 24, the server 5 starts converting the learning model 24 into the logic data 25 (process P4). The server 5 then notifies the terminal device 2 that the new learning model 24 is generated (process P5).

After receiving the notification, the controller 13 of the terminal device 2 sends the request for the new learning model 24 to the server 5 (process P6). The server 5 sends the new learning model 24 and the software for processor 26 to the terminal device 2 (process P7). As a result, the controller 13 of the terminal device 2 obtains the new learning model 24 (process P8), and obtains the software for processor 26 (process P29). After obtaining the new learning model 24, the controller 13 of the terminal device 2 switches the device that carries out the inference to the processor 14 from the programmable logic device 15 (process P10).

The controller 13 of the terminal device 2 may detect the input data D1 to infer before the logic data 25 corresponding to the new learning model 24 is generated (process P11). The instruction to carry out the inference is then sent to the processor 14 from the controller 13 (process P12). The input data D1 is also provided to the processor 14 from the controller 13.

When the instruction to carry out the inference is received, the processor 14 executes the software for processor 26 based on the new learning model 24 to start the inference subjected to the input data D1 (process P13). The inference carried out by the processor 14 ends after an elapse of a predetermined time T1 (process P14). The predetermined time T1 is relatively long time. The result of the inference is output to the controller 13 from the processor 14 (process P15). Nom After obtaining the result of the inference from the processor 14, the controller 13 of the terminal device 2 outputs the result of the inference to the designated destination (process P16). It is assumed that the logic data 25 based on the new learning model 24 has not been generated and the inference based on the new learning model 24 cannot be carried out in the programmable logic device 15. Even in such a case, the terminal device 2 enables the processor 14 to carry out the inference so that the result of the inference to which the new learning model 24 is applied can be output.

Referring FIG. 12, after completion of the processing to convert the learning model 24 into the logic data 25 in the server 5 (process P17), the server 5 notifies the terminal device 2 that the generation of the logic data 25 corresponding to the new learning model 24 is complete (process P18).

After receiving the notification, the controller 13 of the terminal device 2 sends the request for the logic data 25 to the server device 5 (process P19). The server 5 sends the logic data 25 corresponding to the new learning model 24 to the terminal device 2 (process P20).

When the logic data 25 corresponding to the new learning model 24 is obtained, the controller 13 of the terminal device 2 rewrites the logic data in the programmable logic device 15 to the logic data 25 corresponding to the new learning model 24, and sends the instruction to reconstitute the logic circuit to the programmable logic device 15 (process P21). The reconstitution of the logic circuit is then started in the programmable logic device 15 (process P22). When the reconstitution of the logic circuit is complete (process P23), the programmable logic device 15 notifies the controller 13 of the completion of the reconstitution of the circuit (process P24).

When the completion notification is obtained, the controller 13 switches the device that carries out the inference to the programmable logic device 15 (process P25). After detecting the input data D1 to infer (process P26), the controller 13 sends the instruction to carry out the inference to the programmable logic device 15 (process P27). The input data D1 is output to the programmable logic device 15 from the controller 13.

After the instruction to carry out the inference is received, the programmable logic device 15 starts the inference based on the new learning model 24 (process P28). The inference by the programmable logic device 15 ends after an elapse of a predetermined time T2 (process P29). The predetermined time T2 is shorter time than the time T1 which is required for the inference carried out by the processor 14. The programmable logic device 15 is enabled to obtain the result of the inference in shorter time than the processor 14. The programmable logic device 15 outputs the result of the inference to the controller 13 (process P30).

After obtaining the result of the inference from the programmable logic device 15, the controller 13 outputs the result of the inference to the designated destination (process P31). The terminal device 2 puts back to the status in which the programmable logic device 15 carries out the inference once the programmable logic device 15 is enabled to carry out the inference based on the new learning model 24. As a result, the result of the inference to which the new learning model 24 is applied can be output rapidly.

Figure 13:
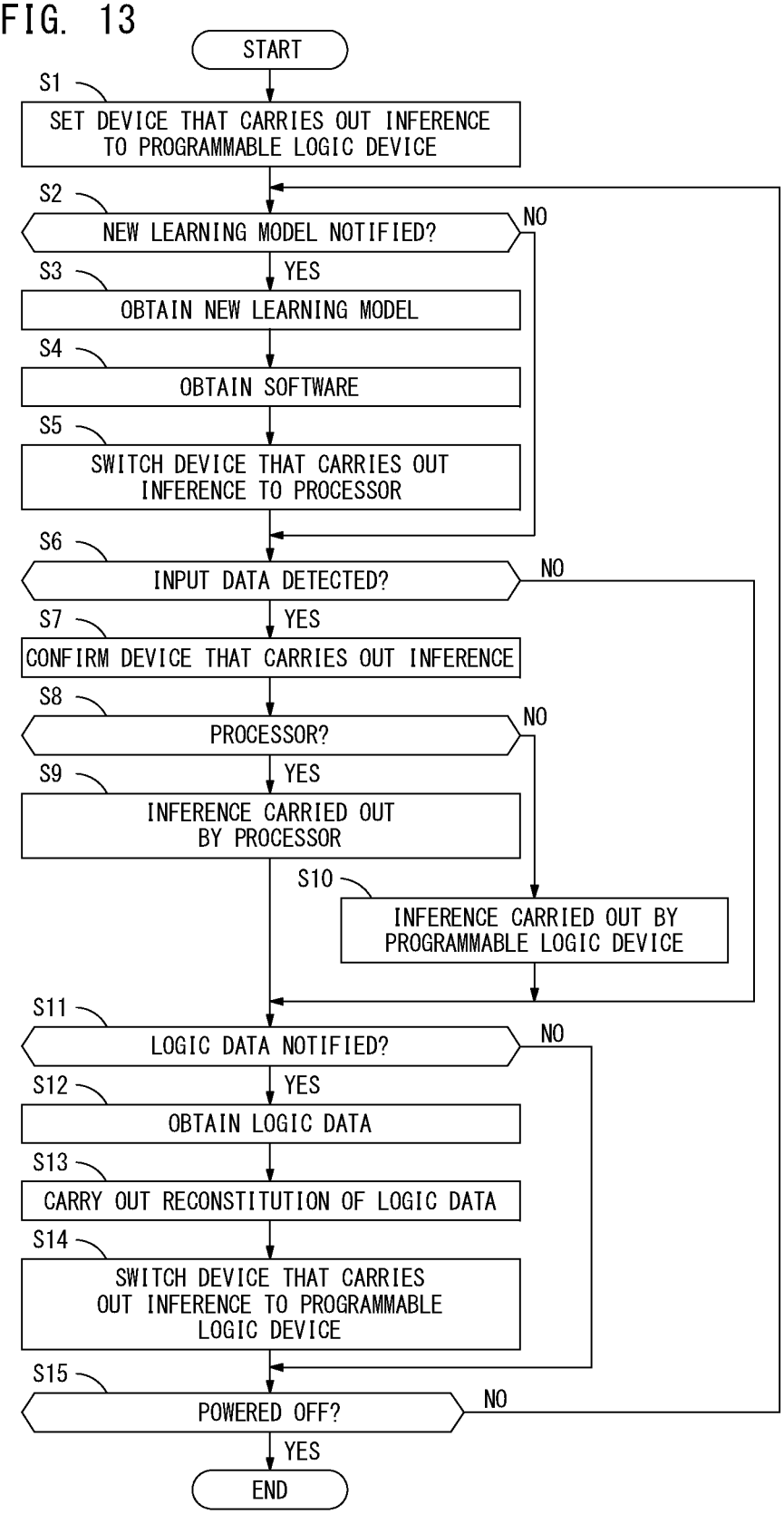
FIG. 13 illustrates an example of a flow diagram explaining an exemplary procedure of the process performed by a controller according to the first embodiment.

A process sequence performed by the controller 13 of the terminal device 2 is explained next. FIG. 13 illustrates an example of a flow diagram explaining an exemplary procedure of the process performed by the controller 13. This process is performed when the CPU of the controller 13 executes the predetermined program. This process is performed by the controller 13 when the terminal device 2 is powered on.

Upon start of the process, the controller 13 initially sets the device that carries out the inference to the programmable logic device 15 (step S1).

The controller 13 determines if the notification that indicates that the new learning model 24 is generated from the server 5 (step S2). The notification might be received (when a result of step S2 is YES). The controller 13 then obtains the new learning model 24 form the server 5 (step S3), and obtains the software for processor 26 (step S4). The controller 13 switches the device that carries out the inference to the processor 14 from the programmable logic device 15 (step S5). The notification of the generation of the new learning model might not be received from the server 5 (when a result of step S2 is NO). In this case, the controller 13 skips the process in steps S2 to S5.

The controller 13 then determines if the input data D1 to infer is detected (step S6). When the input data D1 is detected (when a result of step S6 is YES), the controller 13 confirms the device that carries out the inference (step S7), and determines if the device that carries out the inference is the processor 14 (step S8). The device that carries out the inference may be the processor 14 (when a result of step S8 is YES). In this case, the controller 13 enables the processor 14 to carry out the inference of the input data D1 (step S9). The processor 14 carries out the inference based on the new learning model 24 and the software for processor 26 obtained at steps S3 and S4 so that it may carry out the inference to which the new learning model 24 is applied. When the device that carries out the inference is the programmable logic device 15 (when a result of step S8 is NO), the controller 13 enables the programmable logic device 15 to carry out the inference of the input data D1 (step S10). The input data D1 to infer may not be detected (when a result of step S6 is NO). In this case, the controller 13 skips the process in steps S7 to S10.

The controller 13 determines if the notification that indicates the generation of the logic data 25 corresponding to the new learning model 24 is received from the server 5 (step S11). When the notification is received (when a result of step S1*l* is YES), the controller 13 obtains the logic data 25 corresponding to the new learning model 24 from the server 5 (step S12). The controller 13 reconstitutes the circuit of the programmable logic device 15 based on the logic data 25 obtained from the server 5 (step S13). After the circuit of the programmable logic device 15 is reconstituted, the controller 13 switches the device that carries out the inference to the programmable logic device 15 (step S14). When the notification indicating the generation of the logic data 25 is not received from the server 5 (when a result of step S1*l* is NO), the controller 13 skips the process in steps S12 to S14.

The controller 13 determines if the power of the terminal device 2 is turned off (step S15). When the terminal device 2 is not turned off (when a result of step S15 is NO), the controller 13 repeats the process after step S2. If the terminal device 2 is turned off (when a result of step S15 is YES), the controller 13 completes the process.

The controller 13 carries out the above-described process so that the new learning model 24 is generated in the server 5. While the process to convert the new learning model 24 into the logic data 25 is carried out, the inference is carried out by the processor 14 of the terminal device 2. The inference based on the new learning model 24 is therefore carried out. After the logic data 25 corresponding to the new learning model 24 is generated and the circuit of the programmable logic device 15 is reconstituted based on the logic data 25, the inference is carried out by the programmable logic device 15 of the terminal device 2. As a result, the inference based on the new learning model 24 can be effectively carried out.

As described above, the information processing system 1 of the first embodiment enables the processor 14 to carry out the specified processing based on the new learning model 24 during a period in which the new learning model 24 is converted into the logic data 25 by the converting unit 12. With this structure, the processor 14 carries out the specified processing for the programmable logic device 15 even during the period the programmable logic device 15 cannot carry out the specified processing based on the new learning model 24. Even during the period in which the new learning model 24 is converted into the logic data 25, the specified processing based on the new learning model can be carried out at the early stage.

The process carried out in the terminal device 2 is mainly explained in the example as described above. The process in the terminal device 3 is the same as the above explanation.

Second Embodiment

The second embodiment is explained next. According to the first embodiment, after the terminal device 2 obtains the new learning model 24 and the software for processor 26 from the server 5, the device that carries out the inference is immediately switched to the processor 14 from the programmable logic device 15. As illustrated in FIG. 2, the new pattern image 96 as shown in FIG. 4 is additionally registered to the classification candidate 90 in which the multiple pattern images 91 to 95 are registered in advance. Even in that case, the input image included in the input data D1 may look like one of the multiple pattern images 91 to 95 registered in the previous classification candidate 90. The inference that has high reliability then may be carried out by the programmable logic device 15 even before the circuit of the programmable logic device 15 is reconstituted. If so, the result of the inference can be obtained in a shorter time compared to the case where the inference is carried out by the processor 14.

According to the second embodiment, even while the time the new learning model 24 is being converted into the logic data 25 by the converting unit 12, the controller 13 enables the programmable logic device 15 to carry out the inference first when the input data D1 to infer is obtained. If the reliability of the result of the inference carried out by the programmable logic device 15 is lower than a predetermined value, the controller 13 enables the processor 14 to carry out the inference based on the new learning model 24. The detailed structure of the information processing system 1 of the second embodiment is the same as that explained in the first embodiment.

Figure 14:
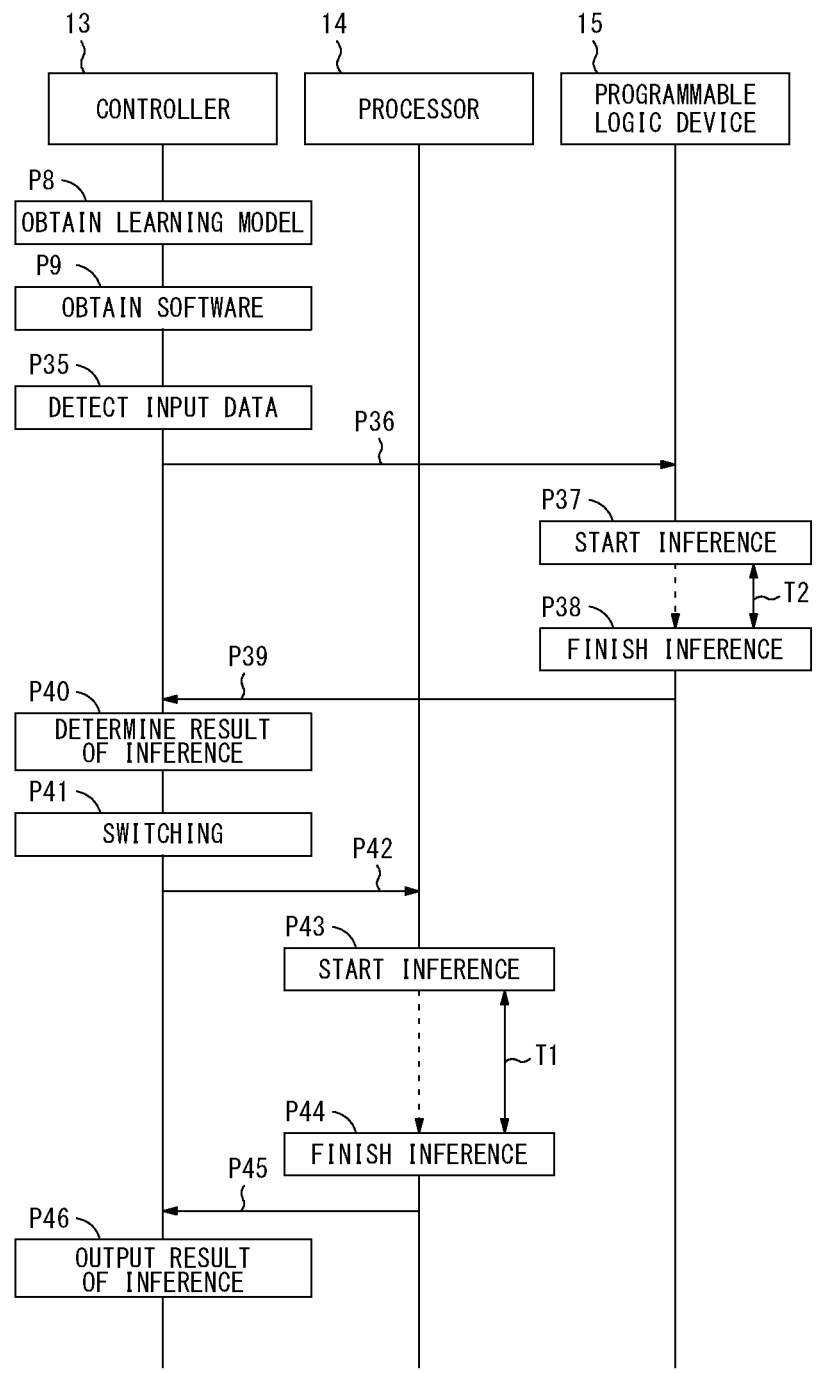
FIG. 14 is a flow diagram showing an exemplary operation performed at the terminal device according to a second embodiment.

FIG. 14 is a flow diagram showing an exemplary operation performed at the terminal device 2 according to the second embodiment. After the new learning model 24 is generated in the server 5, the controller 13 of the terminal device 2 obtains the new learning model 24 and the software for processor 26 from the server 5 through the same process as the first embodiment (process P8 and P9). The controller 13 sets an update flag that indicates that the learning model 24 is updated.

Before the logic data 25 corresponding to the new learning model 24 is generated in the server 5, the controller 13 may detect the input data D1 to infer (process P35). After the controller 13 detects the input data D1 to infer, the controller 13 sends the instruction to carry out the inference to the programmable logic device 15 first (process P36). The controller 13 provides the programmable logic device 15 with the input data D1.

After receiving the instruction to carry out the inference, the programmable logic device 15 starts carrying out the inference based on the previous learning model 24 which had been used before the new learning model 24 is generated (process P37). The programmable logic device 15 finishes the inference after the elapse of the predetermined time T2 (process P38), and outputs the result of the inference to the controller 13 (process P39).

After obtaining the result of the inference from the programmable logic device 15, the controller 13 determines the result of the inference (process P40). More specifically, the controller 13 determines if the reliability of the result of the inference carried out by the programmable logic device 15 is equal to or more than the predetermined value. The controller 13 selects the pattern image that has the highest matching degree to the input image included in the input data D1, and determines if the matching degree between the selected pattern image and the input image is equal to or more than 80%. When the matching degree between the pattern image that has the heist matching degree and the input image is equal to or more than 80%, the controller 13 determines the reliability of the result of the inference by the programmable logic device 15 is more than the predetermined value. When the reliability of the result of the inference by the programmable logic device 15 is more than the predetermined value, the controller 13 outputs the result of the inference to the predetermined destination and finishes the inference.

When the matching degree between the pattern image that has the heist matching degree and the input image is below 80%, the controller 13 determines the reliability of the result of the inference by the programmable logic device 15 is lower than the predetermined value. When the reliability of the result of the inference by the programmable logic device 15 is lower than the predetermined value, the controller 13 switches the device that carries out the inference to the processor 14 from the programmable logic device 15 (process P41). The controller 13 sends the instruction to carry out the inference to the processor 14 (process P42). The controller 13 provides the processor 14 with the input data D1.

When the instruction to carry out the inference is received, the processor 14 starts carrying out the inference based on the new learning model 24 (process P43). The inference carried out by the processor 14 ends after the elapse of the predetermined time T1 (process P44). The result of the inference is output to the controller 13 from the processor 14 (process P45). After obtaining the result of the inference from the processor 14, the controller 13 outputs the result of the inference to the predetermined destination (process P46).

As described above, the information processing system 1 according to the second embodiment enables the programmable logic device 15 to carry out the inference before enabling the processor 14 to carry out the inference when the input data D1 to infer is received while the time the new learning model 24 is converted into the logic data 25 by the converting unit 12. The information processing system 1 determines whether to enable the processor 14 to carry out the inference based on the result of the processing by the programmable logic device 15. As described above, for example, when the reliability of the result of the inference carried out by the programmable logic device 15 is lower than the predetermined value, the information processing system 1 enables the processor 14 to carry out the inference based on the new learning model 24.

Figure 15:
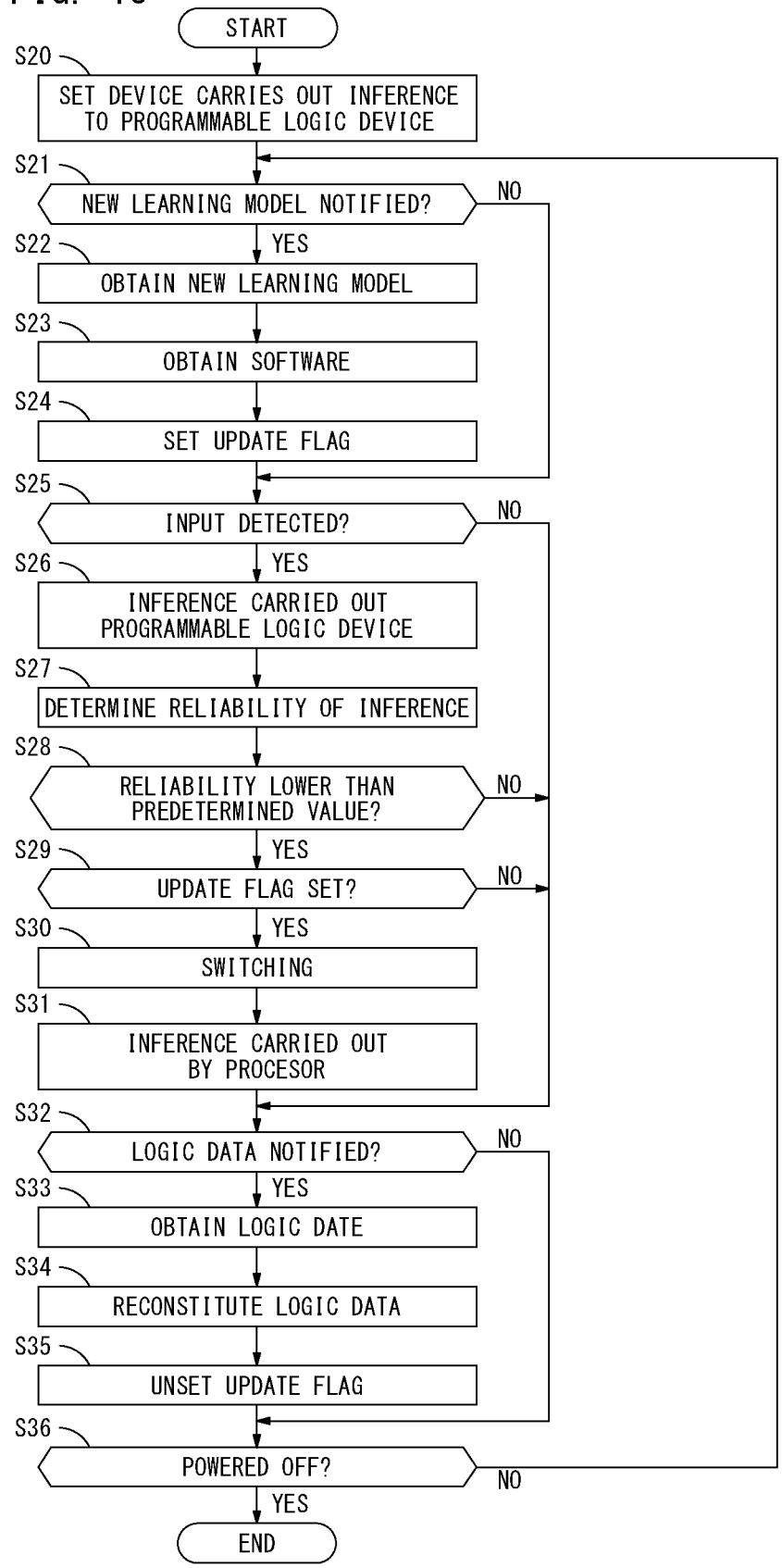
FIG. 15 illustrates an example of a flow diagram explaining an exemplary procedure of the process performed by the controller according to the second embodiment.

A process sequence performed by the controller 13 according to the second embodiment is explained next. FIG. 15 illustrates an example of a flow diagram explaining an exemplary procedure of the process performed by the controller 13. This process is performed when the CPU of the controller 13 executes the predetermined program. This process is performed by the controller 13 when the terminal device 2 is powered on.

Upon start of the process, the controller 13 initially sets the device that carries out the inference to the programmable logic device 15 (step S20).

The controller 13 determines if the notification that indicates the new learning model 24 is generated is received from the server 5 (step S21). The notification may have been received (when a result of step S21 is YES). The controller 13 then obtains the new learning model 24 from the server 5 (step S22), and obtains the software for processor 26 (step S23). The controller 13 sets the update flag that indicates that the learning model 24 is updated to the internal memory (step S24). The update flag is to indicate that the processing to convert the new learning model 24 to the logic data 25 is being carried out in the server 5. The notification of the generation of the new learning model 24 might not be received from the server 5 (when a result of step S21 is NO). In this case, the controller 13 skips the process at steps S21 to S24.

The controller 13 then determines if the input data D1 to infer is detected (step S25). When the input data D1 is detected (when a result of step S25 is YES), the controller 13 enables the programmable logic device 15 to carry out the inference of the input data D1 (step S26). As a result, the programmable logic device 15 carries out the inference based on the new learning model 24 and the software for processor 26 obtained at the steps S22 and S23. The learning model applied to the inference is the previous learning model the one before the generation of the new learning model 24.

After the inference carried out by the programmable logic device 15 ends, the controller 13 determines the reliability of the result of the inference (step S27). More specifically, the controller 13 determines if the reliability of the result of the inference carried out by the programmable logic device 15 is lower than the predetermined value (step S28). If the reliability of the result of the inference is lower than the predetermined value (when a result of step S28 is YES), the controller 13 confirms if the update flag is set (step S29). The update flag may be set (when a result of step S29 is YES). In this case, the controller 13 switches the device that carries out the inference to the processor 14 from the programmable logic device 15 (step S30), and enables the processor 14 to carry out the inference (step S31). Thus, the processor 14 carries out the inference to which the new learning model 24 is applied.

The reliability of the result of the inference carried out by the programmable logic device 15 may be equal to or higher than the predetermined value (when a result of step S28 is NO), or the update flag may not be set (when a result of step S29 is NO). In either case, the controller 13 doesn't carry out the process at the steps S30 and S31. That is because, even still the processor 14 carries out the inference, the same result as the result of the inference carried out by the programmable logic device 15 is obtained. There is not point of enabling the processor 14 to carry out the inference.

The controller 13 determines if the notification that indicates the generation of the logic data 25 corresponding to the new learning model 24 is received from the server 5 (step S32). When the notification is received (when a result of step S32 is YES), the controller 13 obtains the logic data 25 corresponding to the new learning model 24 from the server 5 (step S33). The controller 13 reconstitutes the circuit of the programmable logic device 15 based on the logic data 25 obtained from the server 5 (step S34). After the circuit of the programmable logic device 15 is reconstituted, the controller 13 unsets the update flag (step S35). When the notification indicating the generation of the logic data 25 is not received from the server 5 (when a result of step S32 is NO), the controller 13 skips the process at the steps S33 to S35.

The controller 13 determines if the power of the terminal device 2 is off (step S36). When the terminal device 2 is not powered off (when a result of step S36 is NO), the controller 13 repeats the process after the step S21. If the terminal device 2 is powered off (when a result of step S36 is YES), the controller 13 completes the process.

Even when the new learning model 24 is generated and the logic data 25 based on the new learning model 24 is not applied to the programmable logic device 15, the information processing system 1 according to the second embodiment enables the programmable logic device 15 to carry out the inference first if the input data D1 to infer is obtained. As a result, the information processing system 1 can obtain the result of the inference of the input data D1 fast.

When the reliability of the result of the inference carried out by the programmable logic device 15 is lower than the predetermined value, the information processing system 1 does not apply the result of the inference carried out by the programmable logic device 15 right away and enables the processor 14 to carry out the inference based on the new learning model 24. When the reliability of the result of the inference carried out by the programmable logic device 15 is low, the information processing system 1 enables the processor 14 to carry out the inference so that the result of the inference that is highly reliable can be obtained.

The structures and the operations except for the ones described in the second embodiment are the same as that explained in the first embodiment.

Third Embodiment

The third embodiment of the present invention is explained next. According to the first and the second embodiments, when the input data D1 to infer is obtained while the time the new learning model 24 is converted into the logic data 25, the controller 13 enables the processor 14 to carry out the inference. The inference based on the new learning model 24 is then enabled to be carried out at the early stage.

Multiple input images may be included in the input data D1 to infer. In such a case, the processor 14 needs to carry out the inference of each of the multiple input images one after another. It takes longer time for the processor 14 to carry out the inference compared to the programmable logic device 15 carrying out the inference. It is supposed that it takes a lot of time until finishing all the inferences of each of the multiple input images.

When the input data D1 to infer is obtained while the time the new learning model 24 is converted into the logic data 25 according to the third embodiment, the terminal device 2 distributes the inference to another terminal device 3 connected to the network 4. As a result, the time required until finishing the inference of each of the multiple input images is shortened. The overall structure of the information processing system 1 is the same as that explained in the first embodiment.

Figure 16:
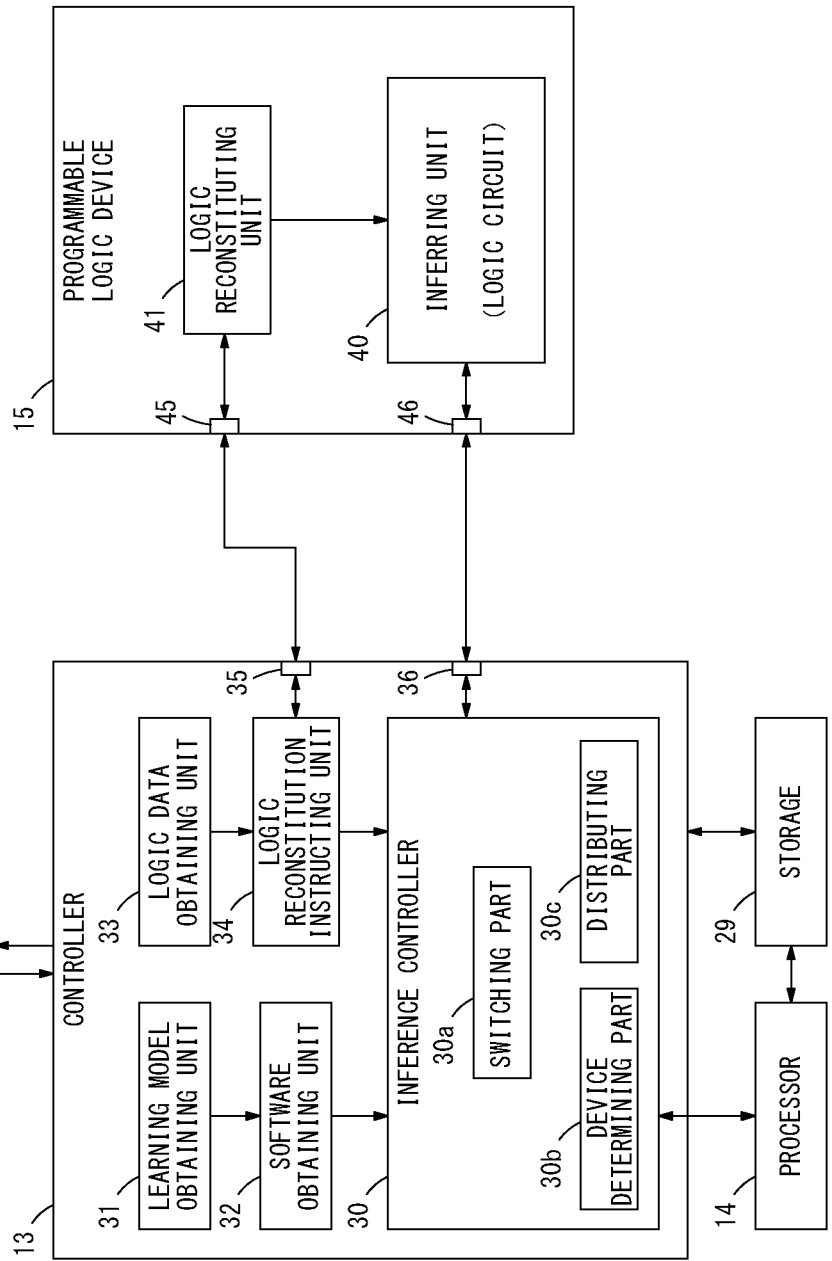
FIG. 16 illustrates a block diagram showing an exemplary hardware structure of the terminal device according to a third embodiment.
Figure 17:
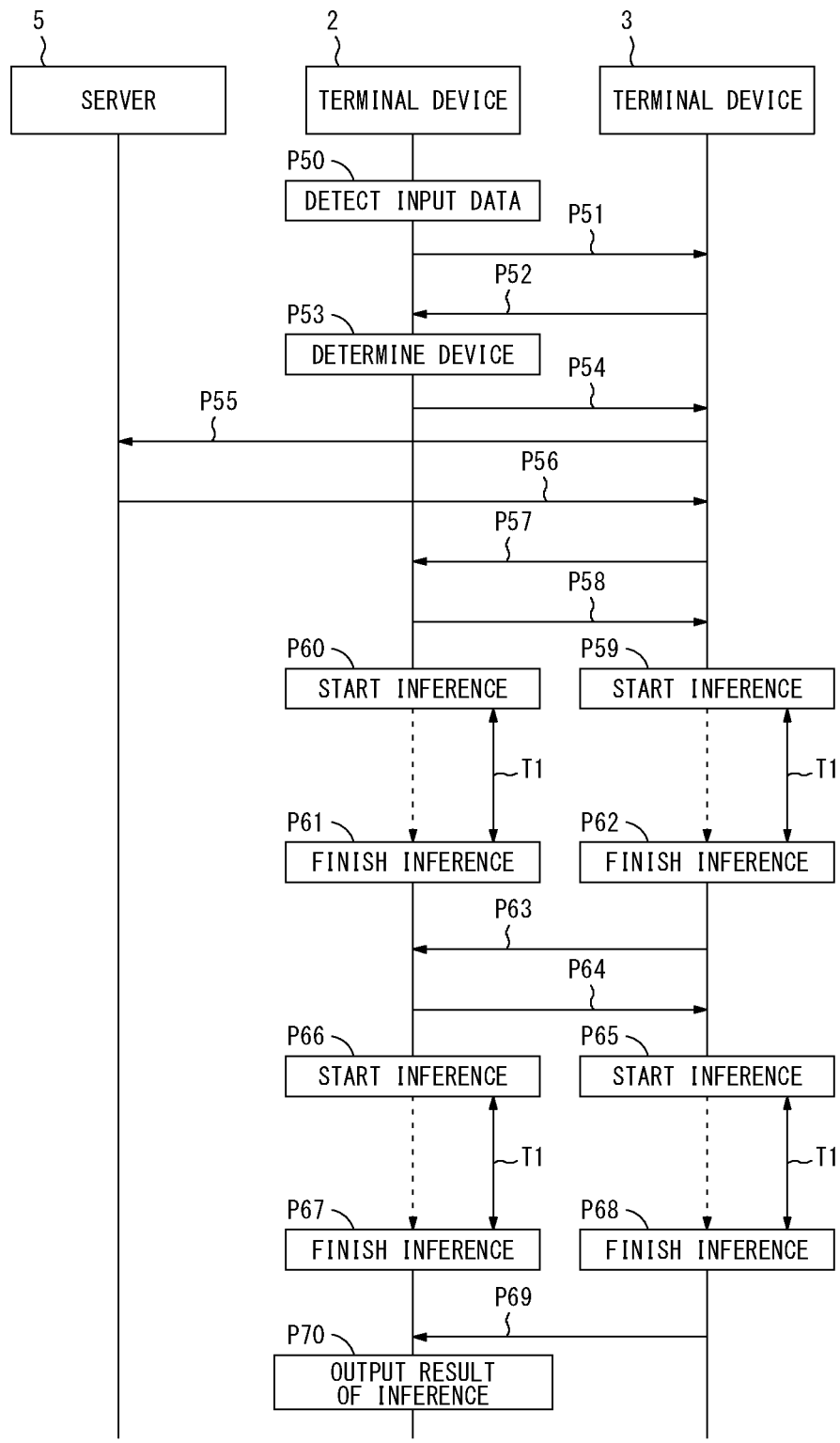
FIG. 17 is a flow diagram showing an exemplary operation performed at the information processing system according to the third embodiment.

FIG. 16 illustrates a block diagram showing an exemplary hardware structure of the terminal device 2 according to the third embodiment. The difference between the terminal device 2 of the third embodiment and the terminal device 2 of the first embodiment is the inference controller 30. More specifically, the inference controller 30 according to the third embodiment includes a device determining part 30*b* and a distributing part 30*c* in addition to the switching part 30*a*.

After obtaining the new learning model 24 and the software for processor 26 from the server 5, the inference controller 30 may obtain the input data D1 to infer without obtaining the logic data 25 corresponding to the new learning model 24. The inference controller 30 then determines if the multiple input images are included in the input data D1. When the multiple input images are included in the input data D1 and the inference of each of the multiple input images is necessary, the inference controller 30 brings the device determining part 30*b* and the distributing part 30*c* into operation.

The device determining part 30*b* obtains device information from another terminal device 3 connected to network 4 and analyzes the device information so that determining if another terminal device 3 can carry out the inference. The device information received by the device determining part 30*b* from another terminal device 3 contains information relating to processing capability of hardware resources such as the CPU and the memory, information relating to usage rate of the hardware resources and version information of an operating system, for example. The device determining part 30*b* refers the information and determines if another terminal device 3 can carry out the inference. Even when the hardware resources and the version of the operating system of another terminal device 3 meet conditions required for carrying out the inference, it is said another terminal device 3 is busy due to another processing if the usage rate of the hardware resources of another terminal device 3 exceeds a predetermined value. The device determining part 30*b* then excludes another terminal device 3 which is being busy from a device that can carry out the inference.

It is assumed that multiple other terminal devices 3 are connected to the network 4. In this case, the device determining part 30*b* obtains the device information from each of the multiple other terminal devices 3, and determines if each of the multiple other terminal devices 3 can cavy out the inference. The device determining part 30*b* selects at least one of the other terminal devices 3 connected to the network 4 as the device that carries out the distributed processing. The device determining part 30*b* may select more than one other terminal devices 3 as the device that carries out the distributed processing.

After selecting another terminal device 3 to enable carrying out the distributed processing, the device determining part 30*b* sends an instruction to obtain the new learning model 24 and the software for processor 26 from the server 5 to the selected another terminal device 3. As a result, another terminal device 3 accesses the server 5 and obtains the new learning model 24 generated in the server 5 and the software for processor 26. Another terminal device 3 is got ready for carrying out the inference.

When the inference of the multiple input images included in the input data D1 is carried out, the distributing part 30c divides the multiple input images into a first image group and a second image group. The image which is inferred by the processor 14 of the terminal device 2 is sorted into the first image group and the image which is inferred by another terminal device 3 selected by the device determining part 30b is sorted into the second image group. The distributing part 30c outputs the first image group to the processor 14 and enables the processor 14 to carry out the inference. The distributing part 30c also outputs the second image group to another terminal device 3 and enables another terminal device 3 to carry out the inference. As a result, the inference by the processor 14 of the terminal device 2 and the inference by the processor 14 of another terminal device 3 are carried out in parallel. The inferences of the multiple input images are carried out at the same time.

FIG. 14 is a flow diagram showing an exemplary operation performed in the information processing system 1 according to the third embodiment. When the new learning model 24 is generated in the server 5 and while the process to convert the new learning model 24 into the logic data 25 is being carried out, the terminal device 2 detects the input data D1 to infer. After detecting the input data D1 and detecting that the multiple input images are included in the input data D1 (process P50), the terminal device 2 requests another terminal device 3 for the device information over the network 4 (process P51). After receiving the request, another terminal device 3 sends the device information to the terminal device 2 (process P52). As a result, the terminal device 2 is enabled to obtain the device information of another terminal device 3.

After obtaining the device information of another terminal device 3, the terminal device 2 determines if another terminal device 3 can carry out the inference (process P53). If another terminal device 3 can carry out the inference, the terminal device 2 sends the instruction to obtain the new learning model 24 and the software for processor 26 from the server 5 to another terminal device 3 (process P54). Another terminal device 3 then requests the server 5 for the new learning model 24 and the software for processor 26 (process P55), and obtains the new learning model 24 and the software for processor 26 from the server 5 (process P56). Another terminal device 3 notifies the terminal device 2 that the new learning model 24 and the software for processor 26 are successfully obtained (process P57).

After another terminal device 3 gets ready for the inference, the terminal device 2 sends one of the input images included in the input data D1 to another terminal device 3 and enables another terminal device 3 to start carrying out the inference of the input image (process P59). Thus, the inference based on the new learning model 24 is carries out in another terminal device 3. The terminal device 2 enables its processor 14 to carry out the inference of another input image included in the input data D1 (process P60). As a result, the terminal device 2 is enabled to carry out the inference based on the new learning model 24 by itself. The inference in the terminal device 2 ends after the elapse of the predetermined time T1 from the start of the inference (process P61). The inference in another terminal device 3 ends after the elapse of the predetermined time T1 from the start of the inference (process P62). After the inference ends, another terminal device 3 outputs the result of the inference to the terminal device 2 (process P63).

The terminal device 2 obtains the result of the inference of the input image from another terminal device 3. The terminal device 2 then sends another input image included in the input data D1 and continuously enables another terminal device 3 to start the inference of another input image (process P65). The terminal device 2 also starts the inference of even another input image included in the input data D1 (process P66). The inference in the terminal device 2 ends after the elapse of the predetermined time T1 from the start of the inference (process P67). The inference in another terminal device 3 ends after the elapse of the predetermined time T1 from the start of the inference (process P68). After the inference ends, another terminal device 3 sends the result of the inference to the terminal device 2, which is the same process as above (process P69).

The terminal device 2 repeatedly carries out the inference by itself and enables another terminal device 3 to carry out the inference in parallel as described above, and finishes the inference of each of the multiple input images included in the input data D1. After finishing the inference of every input image, the terminal device 2 outputs the result of the inference to the designated destination (process P70).

When the multiple input images are included in the input data D1, the information processing system 1 according to the third embodiment distributes the inference at the terminal device 2 and another terminal device 3. The multiple inferences based on the new learning model 24 are then carried out in parallel. As a result, compared to the case where the single terminal device 2 carries out the inference of each of the multiple input images one after another, the result of the inference of every input image can be obtained efficiently.

In the above-described example, the multiple input images are included in the input data D1. However, this is given not for limitation. It is assumed, for example, that while the controller 13 of the terminal device 2 can communicate with another terminal device 3 and the new learning model 24 is converted into the logic data 25 by the converting unit 12 of the server 5, the processor 14 of the terminal device 2 is enabled to carry out the specified processing based on the new learning model 24. A part of the specified processing based on the new leanings model 24 then should be distributed to another terminal device 3. More specifically, the controller 13 enables another terminal device 3 to carry out the distributed processing which is a part of the specified processing based on the new leaning model 24 when enabling its processor 14 to carry out the specified processing based on the new leaning model 24. As a result, the specified processing can be efficiently carried out compared to the case where the terminal device 2 carries out the specified processing on its own.

The structures and the operations except for the ones described in the third embodiment are the same as that explained in the first or the second embodiment. When the terminal device 2, for example, carries out the specified processing based on the new learning model 24, the programmable logic device 15 may be enabled to carry out the specified processing first as described in the second embodiment. If the reliability of the result of the specified processing carried out by the programmable logic device 15 is low, the information processing system 1 may distribute the specified processing to the terminal device 2 and another terminal device 3 to carry out the distributed processing.

Although embodiments of the present invention have been described and illustrated in detail, the disclosed embodiments are made for purposes of illustration and example only and not limitation. The scope of the present invention should be interpreted by terms of the amended claims.

MODIFICATIONS

While the first, the second and the third embodiments of the present invention have been described above, the present invention is not limited to the embodiments. Various modifications may be applied to the present invention.

The information processing system 1 according to the first, the second and the third embodiments includes the server 5, and the functions of the machine learning processing unit 11 and the converting unit 12 are included in the server 5, for example. However, this is given not for limitation. The functions of the machine learning processing unit 11 and the converting unit 12 may be included in the terminal device 2. In that case, the processor 14, the programmable logic device 15, the machine learning processing unit 11, the converting unit 12 and the controller 13 are mounted on the terminal device 2. The terminal device 2 carries out the machine learning by deep learning, and generates the new leaning model for the specified processing. The terminal device 2 then converts the new leaning model into the logic data 25 to make it operable in the programmable logic device 15.

The terminal device 2 can enable the processor 14 to carry out the specified processing based on the new leaning model 24 while the time the new learning model 24 is converted into the logic data 25.

The terminal devices 2 and 3 of the above-described embodiments are constructed by personal computers (PC) or tablet terminals, for instance. However, this is given not for limitation. The above-described terminal devices 2 and 3 may be MFPs that have scan function that optically reads an image of a document and generates image data.

In the above-described embodiments, for example, the inference that infers the matching degree between each of the multiple pattern images set as the classification candidate and the input image when the input image is included in the input data D1 is carried out as an example of the specified processing based on the learning model 24. However, this is given not for limitation. The specified processing is not limited to the inference as described above. More specifically, the specified processing of the present invention is not limited to the image processing.

In the above-described embodiments, the program executed by the CPU of the controller 13 is stored in advance in the storage 29. The program may be provided to the terminal devices 2 and 3 any time. In this case, the program may be provided to the terminal devices 2 and 3 over the network 4 in a manner that enables a user to download. The program may also be provided in a manner that is recorded on a computer readable recording medium such as a CD-ROM or a USB memory.

What is claimed is:

1. An information processing system that carries out a specified processing based on a learning model, comprising:
a processor;
a programmable logic device that rewrites logic data and reconstitutes a circuit;
a machine learning processing unit that carries out machine learning and generates a new learning model for the specified processing;
a convertor that converts the new learning model into the logic data that is operable in the programmable logic device;
a controller that enables the processor to carry out the specified processing based on the new learning model while the new learning model is converted into the logic data by the convertor; and
wherein the controller:
communicates with an external information processing device over a network; and
distributes a part of the specified processing based on the new learning model to the information processing device when enabling the processor to carry out the specified processing based on the new learning model while the new learning model is converted into the logic data by the convertor.

2. The information processing system according to claim 1, wherein the controller:
reconstitutes the circuit of the programmable logic device using the logic data generated by the convertor when the conversion is completed by the convertor; and
switches a device that carries out the specified processing based on the new learning model to the programmable logic device from the processor.

3. The information processing system according to claim 1, wherein
the programmable logic device is a FPGA.

4. The information processing system according to claim 1, wherein
the machine learning processing unit carries out the machine learning by deep learning.

5. The information processing system according to claim 1, wherein
the specified processing is an image processing.

6. The information processing system according to claim 1, wherein
the specified processing is to infer if an input image matches with any of predetermined multiple pattern images, using the learning model.

7. The information processing system according to claim 6, wherein
the pattern image is a logo image.

8. The information processing system according to claim 1, wherein the controller:
enables the programmable logic device to carry out the specified processing before enabling the processor to carry out the specified processing while the new learning model is converted into the logic data by the convertor; and
determines whether to enable the processor to carry out the specified processing based on a result of the processing carried out by the programmable logic device.

9. The information processing system according to claim 8, wherein
the controller enables the processor to carry out the specified processing based on the new learning model when reliability of a result of the processing carried out by the programmable logic device is lower than a predetermined value.

10. The information processing system according to claim 1, wherein
the processor, the programmable logic device and the controller are mounted on a terminal device, and
the machine learning processing unit and the convertor are mounted on a server that communicates with the terminal device.

11. The information processing system according to claim 1, wherein
the processor, the programmable logic device, the machine learning processing unit, the convertor, and the controller are mounted on a terminal device.

12. An information processing method to carry out a specified processing based on a learning model, the method applied at a terminal device comprising:
a processor; and
a programmable logic device that rewrites logic data and reconstitutes a circuit,
wherein the method comprising:
carrying out machine learning and generating a new learning model for the specified processing;
converting the new learning model into the logic data that is operable in the programmable logic device;
enabling the processor to carry out the specified processing based on the new learning model while the new learning model is converted into the logic data; and
wherein
the terminal device communicates with an external information processing device over a network, and
a part of the specified processing based on the new learning model is distributed to the information processing device when the processor is enabled to carry out the specified processing based on the new learning model while the new learning model is converted into the logic data.

13. The information processing method according to claim 12, further comprising:
reconstituting the circuit of the programmable logic device using the generated logic data after the new learning model is converted into the logic data; and
switching a device that carries out the specified processing based on the new learning model to the programmable logic device from the processor.

14. The information processing method according to claim 12, wherein
the machine learning by deep learning is carried out when the new learning model is generated.

15. The information processing method according to claim 12, wherein
the specified processing is an image processing.

16. The information processing method according to claim 12, wherein
the specified processing is to infer if an input image matches with any of predetermined multiple patter images, using the learning model.

17. The information processing method according to claim 16, wherein
the pattern image is a logo image.

18. The information processing method according to claim 12, wherein
the programmable logic device is enabled to carry out the specified processing before the processor is enabled to carry out the specified processing while the new learning model is converted into the logic data; and
whether or not the processor is enabled to carry out the specified processing is determined based on a result of the processing carried out by the programmable logic device.

19. The information processing method according to claim 18, wherein
the processor is enabled to carry out the specified processing based on the new learning model if reliability of a result of the processing carried out by the programmable logic device is lower than a predetermined value.

20. A non-transitory recording medium storing a computer readable program to be executed by a hardware processor in a terminal device comprising:
a processor; and
a programmable logic device that rewrites logic data and reconstitutes a circuit,
wherein the computer readable program causes the hardware processor executing the computer readable program to:
carry out machine learning and generate a new learning model for the specified processing;
convert the new learning model into the logic data that is operable in the programmable logic device;
enable the processor to carry out the specified processing based on the new learning model while the new learning model is converted into the logic data;
communicate with an external information processing device over a network; and
distribute a part of the specified processing based on the new learning model to the information processing device when enabling the processor to carry out the specified processing based on the new learning model while the new learning model is converted into the logic data.

* * * * *